(12) United States Patent
Blohowiak et al.

(10) Patent No.: US 11,884,055 B2
(45) Date of Patent: Jan. 30, 2024

(54) LAMINATED HYBRID METALLIZED POLYMER FILMS, SYSTEM, AND METHOD FOR EROSION PROTECTION OF COMPOSITE STRUCTURES

(71) Applicant: The Boeing Company, Chicago, IL (US)

(72) Inventors: Kay Y. Blohowiak, Issaquah, WA (US); Denise A. Blohowiak, Issaquah, WA (US); James M. Kestner, Seattle, WA (US)

(73) Assignee: The Boeing Company, Arlington, VA (US)

( * ) Notice: Subject to any disclaimer, the term of this patent is extended or adjusted under 35 U.S.C. 154(b) by 574 days.

(21) Appl. No.: 16/365,431

(22) Filed: Mar. 26, 2019

(65) Prior Publication Data
US 2020/0307157 A1  Oct. 1, 2020

(51) Int. Cl.
*B32B 7/12* (2006.01)
*B32B 15/08* (2006.01)
(Continued)

(52) U.S. Cl.
CPC ............... *B32B 7/12* (2013.01); *B32B 15/08* (2013.01); *B32B 37/12* (2013.01); *B32B 38/00* (2013.01);
(Continued)

(58) Field of Classification Search
CPC ............. Y10T 428/14; Y10T 428/1438; Y10T 428/1443; Y10T 428/1452;
(Continued)

(56) References Cited

U.S. PATENT DOCUMENTS 5,542,820 A * 8/1996 Eaton .................... B64C 27/473
416/224
5,814,137 A 9/1998 Blohowiak et al.
(Continued)

OTHER PUBLICATIONS

Extended European Search Report (EESR), European Patent Office, dated Aug. 12, 2020, for counterpart EP Application No. EP20164971.2, Applicant The Boeing Company, 11 pages.
(Continued)

*Primary Examiner* — Maria V Ewald
*Assistant Examiner* — Ethan A. Utt

(57) ABSTRACT

There is provided a laminated hybrid metallized polymer film for erosion protection of a composite structure. The laminated hybrid metallized polymer film includes a metal foil layer, a laminating adhesive layer underlying the metal foil layer, and a polymer film layer underlying the laminating adhesive layer. The polymer film layer is laminated to the metal foil layer with the laminating adhesive layer coupled between the metal foil layer and the polymer film layer. The laminated hybrid metallized polymer film further includes an adhesive layer underlying the polymer film layer. The adhesive layer adheres the polymer film layer to a substrate surface of the composite structure. The metal foil layer, the laminating adhesive layer, the polymer film layer, and the adhesive layer form the laminated hybrid metallized polymer film for application over and to the substrate surface of the composite structure.

23 Claims, 13 Drawing Sheets

(51) Int. Cl.
    B32B 37/12      (2006.01)
    B64C 1/00       (2006.01)
    B32B 38/00      (2006.01)
    B32B 38/16      (2006.01)
(52) U.S. Cl.
    CPC .............. *B32B 38/162* (2013.01); *B64C 1/00* (2013.01); *B32B 2038/0064* (2013.01); *B32B 2307/712* (2013.01); *B32B 2605/18* (2013.01); *B64C 2001/0072* (2013.01); *B64C 2001/0081* (2013.01)
(58) Field of Classification Search
    CPC ......... Y10T 428/1457; Y10T 428/1462; Y10T 428/1471; Y10T 428/1476; Y10T 428/24273; Y10T 428/24298; Y10T 428/24306; Y10T 428/24314; Y10T 428/24322; Y10T 428/24331; Y10T 428/24942; Y10T 428/2495; Y10T 428/24959; Y10T 428/24967; Y10T 428/24975; Y10T 428/26; Y10T 428/263; Y10T 428/264; Y10T 428/265; Y10T 428/266; Y10T 428/269; Y10T 428/27; Y10T 428/273; Y10T 428/28; Y10T 428/2804; Y10T 428/2809; Y10T 428/2813; Y10T 428/2817; Y10T 428/2839; Y10T 428/2843; Y10T 428/2848; Y10T 428/2852; Y10T 428/287; Y10T 428/2878; Y10T 428/2891; Y10T 428/2896; Y10T 428/31507; Y10T 428/31511; Y10T 428/31515; Y10T 428/31518; Y10T 428/31522; Y10T 428/31525; Y10T 428/31529; Y10T 428/31533; Y10T 428/3154; Y10T 428/31551; Y10T 428/31553; Y10T 428/31562; Y10T 428/31565; Y10T 428/31573; Y10T 428/3158; Y10T 428/31587; Y10T 428/31598; Y10T 428/31601; Y10T 428/31605; Y10T 428/31612; Y10T 428/31616; Y10T 428/31623; Y10T 428/31645; Y10T 428/31649; Y10T 428/31678; Y10T 428/31681; Y10T 428/31692; Y10T 428/31699; Y10T 428/31721; Y10T 428/31725; Y10T 428/3175; Y10T 428/31786; Y10T 428/31797; Y10T 428/31855; Y10T 428/31935; Y10T 428/31938; Y10T 428/31; Y10S 428/9088; B32B 3/00; B32B 3/24; B32B 3/26; B32B 3/266; B32B 7/00; B32B 7/04; B32B 7/12; B32B 15/00; B32B 15/02; B32B 15/04; B32B 15/043; B32B 15/08; B32B 15/082; B32B 15/085; B32B 15/088; B32B 15/09; B32B 15/092; B32B 15/095; B32B 15/18; B32B 15/20; B32B 17/00; B32B 17/02; B32B 17/04; B32B 27/00; B32B 27/04; B32B 27/06; B32B 27/08; B32B 27/28; B32B 27/281; B32B 27/283; B32B 27/285; B32B 27/286; B32B 27/288; B32B 27/30; B32B 27/304; B32B 27/308; B32B 27/32; B32B 27/34; B32B 27/36; B32B 27/365; B32B 27/38; B32B 27/40; B32B 33/00; B32B 2605/18; B64C 1/00; B64C 1/12; B64C 2001/0054; B64C 2001/0072; B64C 2001/0081; B64C 3/00; B64C 3/26; C09J 7/00; C09J 7/20; C09J 7/22; C09J 7/24; C09J 7/241; C09J 7/243; C09J 7/245; C09J 7/25; C09J 7/255; C09J 7/28; C09J 7/29; C09J 7/30; C09J 7/35; C09J 7/38; C09J 7/381; C09J 7/383; C09J 7/385; C09J 7/387; C09J 7/50; C09J 2203/306; C09J 2203/35
    USPC ......... 428/40.1, 40.9, 41.1, 41.3, 41.4, 41.5, 428/41.7, 41.8, 131, 134–138, 212–216, 428/219, 220, 332, 334–337, 339–341, 428/343–347, 352–355 R, 355 EP, 428/355 EN, 355 AC, 355 N, 412, 428/413–418, 419, 421, 423.1, 423.3, 428/423.5, 423.7, 424.2, 424.6, 424.8, 428/425.5, 425.6, 425.8, 426, 428–430, 428/432–435, 441, 442, 457, 458, 461, 428/463, 473.5, 474.4, 476.3, 480, 483, 428/500, 522, 523, 704, 908.8, 409, 428/446–448, 450, 451; 244/117 R, 119, 244/123.1, 129.1
    See application file for complete search history.

(56) References Cited

U.S. PATENT DOCUMENTS

| | | | |
|---|---|---|---|
| 5,849,110 A | 12/1998 | Blohowiak et al. | |
| 5,866,272 A * | 2/1999 | Westre | B64C 30/00 244/119 |
| 5,939,197 A | 8/1999 | Blohowiak et al. | |
| 5,958,578 A | 9/1999 | Blohowiak et al. | |
| 6,776,918 B1 * | 8/2004 | Yoshikawa | C23F 1/26 148/279 |
| 6,797,376 B2 | 9/2004 | Anderson et al. | |
| 7,525,785 B2 | 4/2009 | Rawlings | |
| 7,544,407 B1 | 6/2009 | Rawlings et al. | |
| 7,807,229 B2 | 10/2010 | Rawlings et al. | |
| 8,715,824 B2 | 5/2014 | Rawlings et al. | |
| 2005/0181203 A1 * | 8/2005 | Rawlings | B32B 38/0008 428/458 |
| 2008/0142238 A1 | 6/2008 | Rawlings | |
| 2008/0144249 A1 * | 6/2008 | Rawlings | B64D 45/02 361/117 |
| 2008/0258008 A1 * | 10/2008 | Cooper | B64C 1/12 244/131 |
| 2010/0008788 A1 * | 1/2010 | Barbee | F01D 5/288 416/224 |
| 2016/0167791 A1 * | 6/2016 | Roach | C25D 7/00 428/458 |
| 2017/0174312 A1 * | 6/2017 | Cross | B29C 70/885 |
| 2017/0370233 A1 * | 12/2017 | Kinlan | F01D 5/141 |

OTHER PUBLICATIONS

Examination Report, European Patent Office, dated Mar. 10, 2022, for counterpart EP Application No. EP 20164971.2, Applicant The Boeing Company, 5 pages.

Office Action and Examination Search Report, Canadian Intellectual Property Office, dated May 26, 2023, for counterpart Canadian Application No. 3,068,679, Owner (Applicant) The Boeing Company, 6 pages.

Notification of First Office Action and Search Report, National Intellectual Property Administration, People's Republic of China (PRC), dated Feb. 22, 2023, for counterpart Chinese Application No. 2020100885710, Applicant The Boeing Company, 13 pages.

Decision of Rejection Office Action, National Intellectual Property Administration, People's Republic of China (PRC), dated Sep. 8, 2023, for counterpart Chinese Application No. 2020100885710, Applicant The Boeing Company, 9 pages.

* cited by examiner

LAMINATED HYBRID METALLIZED POLYMER FILM(S) 10

METAL FOIL LAYER (FL) 40

| TI FL 40a | TI ALLOY FL 40b | NICKEL FL 40c | NICKEL ALLOY FL 40d | SS FL 40e |
|---|---|---|---|---|
| SS ALLOY FL 40f | AL FL 40g | AL COPPER FL 40h | COPPER FL 40i | COPPER ALLOY FL 40j |

| METAL MATERIAL(S) 44 | TI 44a | TI ALLOY 44b | NICKEL 44c | NICKEL ALLOY 44d |
|---|---|---|---|---|
| SS 44e | SS ALLOY 44f | AL 44g | AL ALLOY 44h | COPPER 44i | COPPER ALLOY 44j |

| CONFIGURATION(S) 46 | PLAIN METAL FOIL (MF) 46a | SLOTTED MF 46b |
|---|---|---|
| PERFORATED MF 46c | EXPANDED MF 46d | MESH MF 46e |

| SURF.(S) 45 | TREATED SURF.(S) 45a | PRIMER LAYER 47 | MET. FOIL 42 | THICKNESS 48 |

LAMINATING ADHESIVE LAYER (AL) 50

| URETHANE AL 50a | POLYURETHANE AL 50b | EPOXY AL 50c |
|---|---|---|
| POLYSILOXANE AL 50d | SILICONE AL 50e | ACRYLIC AL 50f |

| LAMINATING ADHESIVE 52 | THICKNESS 56 |

| LAMINATING ADHESIVE MATERIAL(S) 54 | URETHANE 54a | POLYURETHANE 54b |
|---|---|---|
| EPOXY 54c | POLYSILOXANE 54d | SILICONE 54e | ACRYLIC 54f |

POLYMER FILM LAYER (FL) 60

| PEEK FL 60a | POLYESTER FL 60b | PET FL 60c | PP FL 60d | PE FL 60e |
|---|---|---|---|---|
| PTT FL 60f | PA FL 60g | PEI FL 60h | PVC FL 60i | PC FL 60j | NYLON FL 60k |
| PEKK FL 60l | PPSU FL 60m | PPS FL 60n | ECTFE FL 60o | PVDF FL 60p |

| POLYMER FILM 62 | ELASTOMERIC POLYMER BACKING FILM 68 | THICKNESS 66 |

| POLYMER MATERIAL(S) 64 | PEEK 64a | POLYESTER 64b | PET 64c |
|---|---|---|---|
| PP 64d | PE 64e | PTT 64f | PA 64g | PEI 64h | PVC 64i | PC 64j |
| NYLON 64k | PEKK 64l | PPSU 64m | PPS 64n | ECTFE 64o | PVDF 64p |

ADHESIVE LAYER (AL) 70

| SEALANT AL 72 | POLYTHIOETHER SEALANT AL 72a | PS SEALANT AL 72b |
|---|---|---|
| PSA LAYER 74 | THICKNESS 78 | CURABLE FILM AL 76 | HEAT CURABLE FILM AL 76a |

| FORM 30 | TAPE 32 | TAPE ROLL 32a | TAPE STRIP 32b | APPLIQUE 34 | SHEET 36 | OL 38 |

FIG. 1

LAMINATED HYBRID METALLIZED POLYMER FILMS, SYSTEM, AND METHOD FOR EROSION PROTECTION OF COMPOSITE STRUCTURES

FIELD

The disclosure relates generally to hybrid films, hybrid film systems, and methods of forming the same, and more particularly, to laminated hybrid metallized polymer films, systems, and methods of forming the same, to provide erosion protection of composite structures, such as aircraft composite structures.

BACKGROUND

Known systems and methods exist for providing erosion protection or edge protection of composite structures, such as aircraft composite structures. In such situations, the term "erosion" refers to physical changes to the composite as a result of exposure to an external airstream. For example, one known system and method includes use of strips of metal foil, such as titanium foil, adhered with a sealant to the cut edges of aircraft composite structures, to prevent any impact to the surface of the aircraft composite structures in an external airstream.

However, such strips of titanium foil may be heavy, expensive, and required careful handling during processing and shipping. Moreover, the application process for applying such strips of titanium foil typically requires highly trained manufacturing technicians to manually apply the strips, and such manual application may present ergonomic issues. Further, for curved surfaces and corners of cut edges, the strips of titanium foil may need to be bent and formed into a desired shape to fit over the curved surfaces and corners. This may require custom tooling to form the strips of titanium foil into the desired shape for installation, and such custom tooling may increase manufacturing costs.

Another known system and method for providing erosion protection or edge protection of composite structures, such as aircraft composite structures, includes a coating-based solution. Coatings may be either spray applied or roll applied over the edge surfaces of the composite structures, such as aircraft composite structures, to be protected. However, it may be challenging to apply such coatings in a precise area with precision thickness over long narrow surfaces. Further, care must be taken to ensure that acceptable coating coverage is achieved over cut edges and around corners of composite structures, such as aircraft composite structures, that have complex curvature.

Accordingly, there is a need in the art for an apparatus, system, and method for providing erosion protection of composite structures, such as aircraft composite structures, that improve the ease of handling and installation, that are less expensive, and that provide advantages over known products, systems, and methods.

SUMMARY

Example implementations of the present disclosure provide a laminated hybrid metallized polymer film, system, and method for erosion protection of composite structures, such as aircraft composite structures. As discussed in the below detailed description, versions of the laminated hybrid metallized polymer film, system, and method may provide significant advantages over known products, systems, and methods.

In a version of the disclosure, there is provided a laminated hybrid metallized polymer film for erosion protection of a composite structure. The laminated hybrid metallized polymer film comprises a metal foil layer. The laminated hybrid metallized polymer film further comprises a laminating adhesive layer underlying the metal foil layer.

The laminated hybrid metallized polymer film further comprises a polymer film layer underlying the laminating adhesive layer. The polymer film layer is laminated to the metal foil layer with the laminating adhesive layer coupled between the metal foil layer and the polymer film layer. The laminated hybrid metallized polymer film further comprises an adhesive layer underlying the polymer film layer. The adhesive layer adheres the polymer film layer to a substrate surface of the composite structure.

The metal foil layer, the laminating adhesive layer, the polymer film layer, and the adhesive layer form the laminated hybrid metallized polymer film, for application over and to the substrate surface of the composite structure.

In another version of the disclosure, there is provided a system for erosion protection of an aircraft composite structure. The system comprises a substrate surface of the aircraft composite structure. The substrate surface has one or more cut edges. The system further comprises a laminated hybrid metallized polymer film applied over and to the substrate surface of the aircraft composite structure.

The laminated hybrid metallized polymer film comprises a metal foil layer. The laminated hybrid metallized polymer film further comprises a laminating adhesive layer underlying the metal foil layer.

The laminated hybrid metallized polymer film further comprises a polymer film layer underlying the laminating adhesive layer. The polymer film layer is laminated to the metal foil layer with the laminating adhesive layer coupled between the metal foil layer and the polymer film layer.

The laminated hybrid metallized polymer film further comprises an adhesive layer underlying the polymer film layer, the adhesive layer adhering the polymer film layer to the substrate surface of the aircraft composite structure. When the aircraft composite structure is exposed to an airstream, the laminated hybrid metallized polymer film applied over and to the substrate surface provides erosion protection of the aircraft composite structure from the airstream.

In another version of the disclosure, there is provided a method for providing erosion protection of a composite structure. The method comprises the step of forming a laminated hybrid metallized polymer film.

The laminated hybrid metallized polymer film comprises a metal foil layer. The laminated hybrid metallized polymer film further comprises a laminating adhesive layer underlying the metal foil layer. The laminated hybrid metallized polymer film further comprises a polymer film layer underlying the laminating adhesive layer. The polymer film layer is laminated to the metal foil layer with the laminating adhesive layer coupled between the metal foil layer and the polymer film layer. The laminated hybrid metallized polymer film further comprises an adhesive layer underlying the polymer film layer.

The method further comprises the step of preparing a substrate surface of the composite structure, to obtain a prepared substrate surface. The method further comprises the step of applying the laminated hybrid metallized polymer film over and to the prepared substrate surface of the composite structure. The adhesive layer adheres the polymer film layer to the prepared substrate surface. When the composite structure is exposed to one or more erosion conditions, the laminated hybrid metallized polymer film applied over and to the prepared substrate surface provides erosion protection to the composite structure from the one or more erosion conditions.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein:

FIG. 1 is an illustration of a functional block diagram showing exemplary versions of a laminated hybrid metallized polymer film of the disclosure;

The figures shown in this disclosure represent various aspects of the versions presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 2:
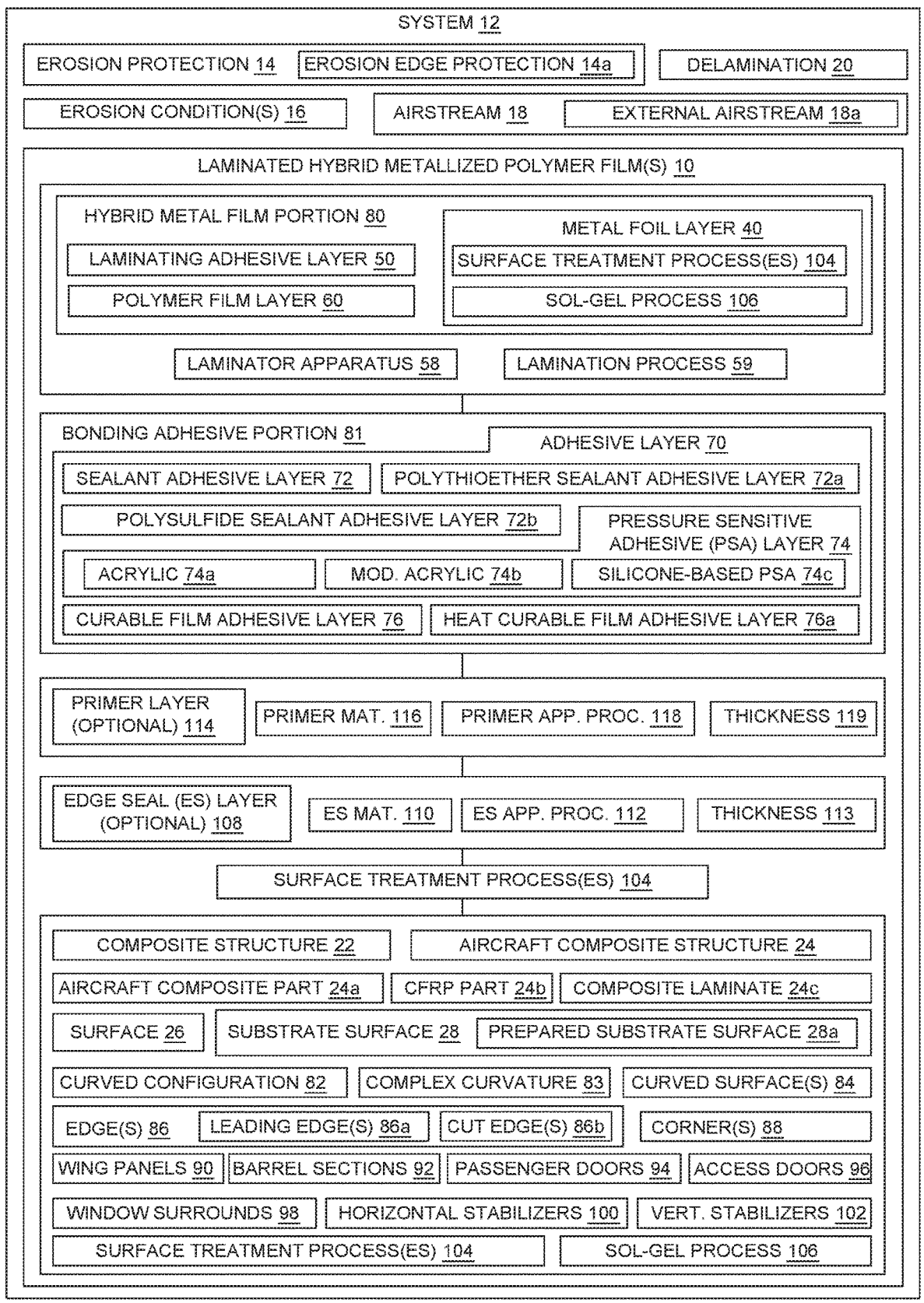
FIG. 2 is an illustration of a functional block diagram showing an exemplary version of a system of the disclosure.

Now referring to the Figures, FIG. 1 is an illustration of a functional block diagram showing exemplary versions of a laminated hybrid metallized polymer film 10 of the disclosure, and FIG. 2 is an illustration of a functional block diagram showing an exemplary version of a system 12 of the disclosure, where the system 12 incorporates versions of the laminated hybrid metallized polymer films 10.

In a version of the disclosure, there is provided the laminated hybrid metallized polymer film 10 (see FIGS. 1, 2) for erosion protection 14 (see FIG. 2), such as erosion edge protection 14a (see FIG. 2), from one or more erosion conditions 16 (see FIG. 2), for example, an airstream 18 (see FIG. 2), such as an external airstream 18a (see FIG. 2), to prevent or minimize delamination 20, of a composite structure 22 (see FIG. 2), such as an aircraft composite structure 24 (see FIG. 2).

The laminated hybrid metallized polymer film 10 (see FIGS. 1, 2) is preferably applied over and to a surface 26 (see FIG. 2), such as a substrate surface 28 (see FIG. 2), of the composite structure 22. When the composite structure 22 is exposed to one or more erosion conditions 16, the laminated hybrid metallized polymer film 10 applied over and to the surface 26, such as the substrate surface 28, provides erosion protection 14 of the composite structure 22 from the one or more erosion conditions 16.

As shown in FIG. 1, the laminated hybrid metallized polymer film 10 may be manufactured, or processed, in a form 30, such as a tape 32, including a tape roll 32a, or a tape strip 32b. Alternatively, as shown in FIG. 1, the laminated hybrid metallized polymer film 10 may be manufactured, or processed, in the form 30 of an applique 34, a sheet 36, an overlay 38, or another suitable form 30.

As shown in FIGS. 1, 2, the laminated hybrid metallized polymer film 10 comprises a metal foil layer 40. The metal foil layer 40 comprises a metal (met.) foil 42 (see FIG. 1). As shown in FIG. 1, the metal foil 42 may be made of one or more metal materials 44, such as titanium (TI) 44a, titanium (TI) alloy 44b, nickel 44c, nickel alloy 44d, stainless steel (SS) 44e, stainless steel (SS) alloy 44f, aluminum (AL) 44g, aluminum (AL) alloy 44h, copper 44i, copper alloy 44j, or another suitable metal material 44. Although these metal materials 44 are preferred, other suitable metal materials 44 may also be used. The metal materials 44 used are preferably good for erosion protection. As further shown in FIG. 1, preferably, the metal foil layer (FL) 40 comprises one of, a titanium foil layer (TI FL) 40a, for example a pure titanium foil layer, a titanium (TI) alloy foil layer (FL) 40b, a nickel foil layer (FL) 40c, a nickel alloy foil layer (FL) 40d, a stainless steel foil layer (SS FL) 40e, a stainless steel (SS) alloy foil layer (FL) 40f, an aluminum foil layer (AL FL) 40g, an aluminum (AL) alloy foil layer (FL) 40h, a copper foil layer (FL) 40i, a copper alloy foil layer (FL) 40j or another suitable metal foil layer 40. More preferably, the metal foil layer 40 comprises the titanium foil layer 40a.

In addition, one or more surfaces 45 (see FIG. 1) of the metal foil layer 40, for example, a second side 140b (see FIG. 5A) of the metal foil layer 40, may be surface treated with one or more surface treatment processes 104 (see FIG. 2), to obtain one or more treated surfaces 45a (see FIG. 1), for example, to facilitate adhesion to a laminating adhesive layer 50 (see FIG. 1) of the laminated hybrid metallized polymer film 10. An example of a surface treatment process 104 that may be used includes a sol-gel process 106 (see FIG. 2) to treat or prepare the metal foil layer 40, such as a sol-gel process disclosed in U.S. Pat. Nos. 5,939,197, 5,958, 578, and 6,797,376, the contents of which are hereby incorporated by reference in their entireties. However, other types of surface treatment processes 104 may also be used to surface treat the metal foil layer 40 prior to undergoing a lamination process 59 (see FIG. 2). In addition, the one or more treated surfaces 45a of the metal foil layer 40 may then be primed with a primer layer 47 (see FIGS. 1, 5A). The primer layer 47 may comprise a bond primer or an exterior primer, for example, an epoxy-based primer system, including a two-part system or a one-part system. The two-part system may comprise a urethane compatible epoxy primer, or another suitable two-part system. The urethane compatible epoxy primer may be used to protect metal foils 42 (see FIG. 1), such as made of aluminum 44g (see FIG. 1), or another metal material 44 (see FIG. 1), and may be used to protect composite substrates. The one-part system may comprise an adhesive bond primer including a heat-curing adhesive bond primer, may comprise a corrosion inhibiting primer including a chromate-based modified epoxy primer, or may comprise another suitable one-part system. The epoxy-based primer system may contain corrosion inhibiting pigments, and some may be specifically formulated for composites.

The primer layer 47 is preferably applied with a primer application process 118 (see FIG. 2). Thus, the metal foil layer 40 has a surface 45 that may be surface treated with a surface treatment process 104, to obtain a treated surface 45a, and the treated surface 45a of the metal foil layer 40 may be primed with a primer layer 47, prior to a polymer film layer 60 being laminated to the metal foil layer 40, or prior to the metal foil layer 40 being laminated to the polymer film layer 60.

In addition, the metal foil layer 40 may be processed or modified prior to forming the laminated hybrid metallized polymer film 10. The metal foil layer 40 may have various configurations 46 (see FIG. 1). As shown in FIG. 1, the metal foil layer 40 may have a configuration 46 comprising a plain metal foil 46a (see also FIG. 3A), which is not processed or modified before application to the surface 26 (see FIG. 2), such as the substrate surface 28 (see FIG. 2), of the composite structure 22 (see FIG. 2). Alternatively, as shown in FIG. 1, the metal foil layer 40 may be processed or modified and have a configuration 46 comprising one of, a slotted metal foil 46b (see also FIG. 3B), a perforated metal foil 46c (see also FIG. 3C), an expanded metal foil 46d (see also FIG. 3D), a mesh metal foil 46e (see also FIG. 3E), or another suitable configuration 46. The configurations 46 shown in FIGS. 3A-3E are discussed in further detail below.

Preferably, the metal foil layer 40 (see FIG. 1) has a thickness 48 (see FIG. 1) in a range of from 0.0001 inch (0.1 mil) to 0.020 inch (20 mils). More preferably, the metal foil layer 40 has a thickness 48 in a range of from 0.001 inch (1 mil) to 0.005 inch (5 mils).

As shown in FIGS. 1, 2, the laminated hybrid metallized polymer film 10 further comprises the laminating adhesive layer 50 underlying the metal foil layer 40. The laminating adhesive layer 50 comprises a laminating adhesive 52. The laminating adhesive 52 may be made of one or more laminating adhesive materials 54, such as urethane 54a including polyurethane 54b, epoxy 54c, polysiloxane 54d, silicone 54e, acrylic 54f, or another suitable laminating adhesive material 54. As shown in FIG. 1, the laminating adhesive layer (AL) 50 may comprise one of, a urethane adhesive layer (AL) 50a including a polyurethane adhesive layer (AL) 50b, an epoxy adhesive layer (AL) 50c, a polysiloxane adhesive layer (AL) 50d, a silicone adhesive layer (AL) 50e, an acrylic adhesive layer (AL) 50f, or another suitable laminating adhesive layer 50.

Preferably, the laminating adhesive layer 50 (see FIG. 1) has a thickness 56 (see FIG. 1) in a range of from 0.0001 inch (0.1 mil) to 0.0020 inch (2 mils). More preferably, the laminating adhesive layer 50 has a thickness 56 in a range of from 0.0001 inch (0.1 mil) to 0.0005 inch (0.5 mil). A laminator apparatus 58 (see FIG. 1), or machine, may be used to apply the laminating adhesive layer 50 to the metal foil layer 40 (see FIGS. 1-2), or to the polymer film layer 60 (see FIGS. 1-2), and may be used to press the metal foil layer 40, the laminating adhesive layer 50, and the polymer film layer 60 together in a lamination process 59 (see FIG. 2).

As shown in FIGS. 1, 2, the laminated hybrid metallized polymer film 10 further comprises the polymer film layer 60 underlying the laminating adhesive layer 50. The polymer film layer 60 is laminated to the metal foil layer 40 with the laminating adhesive layer 50, and the laminating adhesive layer 50 is coupled, or sandwiched, between the metal foil layer 40 and the polymer film layer 60, and holds or adheres the metal foil layer 40 to the polymer film layer 60.

The polymer film layer 60 comprises a polymer film 62 (see FIG. 1). As shown in FIG. 1, the polymer film 62 may be made of one or more polymer materials 64, such as polyether ether ketone (PEEK) 64a, polyester 64b, polyethylene terephthalate (PET) 64c, polypropylene (PP) 64d, polyethylene (PE) 64e, polytrimethylene terephthalate (PTT) 64f, polyamide (PA) 64g, polyetherimide (PEI) 64h, polyvinyl chloride (PVC) 64i, polycarbonate (PC) 64j, nylon 64k, polyetherketoneketone (PEKK) 64l, polyphenylsulfone (PPSU) 64m, polyphenylene sulfide (PPS) 64n, ethylene chlorotrifluoroethylene (ECTFE) 64o, polyvinylidene fluorine (PVDF) 64p, or another suitable polymer material 64. As further shown in FIG. 1, preferably, the polymer film layer (FL) 60 may comprise one of, a polyether ether ketone film layer (PEEK FL) 60a, a polyester film layer (FL) 60b, a polyethylene terephthalate film layer (PET FL) 60c, a polypropylene film layer (PP FL) 60d, a polyethylene film layer (PE FL) 60e, a polytrimethylene terephthalate film layer (PTT FL) 60f, a polyamide film layer (PA FL) 60g, a polyetherimide film layer (PEI FL) 60h, a polyvinyl chloride film layer (PVC FL) 60i, a polycarbonate film layer (PC FL) 60j, a nylon film layer (FL) 60k, a polyetherketoneketone film layer (PEKK FL) 60l, a polyphenylsulfone film layer (PPSU FL) 60*m*, a polyphenylene sulfide film layer (PPS FL) 60*n*, an ethylene chlorotrifluoroethylene film layer (ECTFE FL) 60*o*, a polyvinylidene fluorine film layer (PVDF FL) 60*p*, or another suitable polymer film layer 60.

Preferably, the polymer film layer 60 has a thickness 66 (see FIG. 1) in a range of from 0.0003 inch (0.3 mil) to 0.020 inch (20 mils). More preferably, the polymer film layer 60 has a thickness 66 in a range of from 0.001 inch (1 mil) to 0.005 inch (5 mils).

The polymer film layer 60 (see FIG. 1) may be in the form of an elastomeric polymer backing film 68 (see FIG. 1) that is laminated, or is configured to be laminated, to the metal foil layer 40, via the laminating adhesive layer 50, by using the lamination process 59 (see FIG. 2). The polymer film layer 60 (see FIG. 1), such as in the form of the elastomeric polymer backing film 68 (see FIG. 1), provides flexibility and handleability to the metal foil layer 40.

As shown in FIGS. 1, 2, the laminated hybrid metallized polymer film 10 further comprises an adhesive layer 70 underlying the polymer film layer 60. The adhesive layer 70 adheres the polymer film layer 60 to the surface 26 (see FIG. 2), such as the substrate surface 28 (see FIG. 2), of the composite structure 22 (see FIG. 2), such as the aircraft composite structure 24 (see FIG. 2).

In one version, as shown in FIGS. 1, 2, and discussed below with regard to FIGS. 4A-4C, the adhesive layer (AL) 70 of the laminated hybrid metallized polymer film 10 may comprise one of, a sealant adhesive layer (AL) 72 including a polythioether sealant adhesive layer (AL) 72*a*, a polysulfide (PS) sealant adhesive layer (AL) 72*b*, or another suitable sealant adhesive layer 72.

In another version, as shown in FIGS. 1, 2, and discussed below with regard to FIGS. 5A-5C, the adhesive layer 70 of the laminated hybrid metallized polymer film 10 may comprise a pressure sensitive adhesive (PSA) layer 74. Preferably, the PSA layer 74 may comprise acrylic 74*a* (see FIG. 2), a modified (mod.) acrylic 74*b* (see FIG. 2), a silicone-based pressure sensitive adhesive (PSA) 74*c* (see FIG. 2), or another suitable PSA layer 74. The PSA layer 74 is preferably pre-applied to a hybrid metal film portion 80 (see FIG. 2) made up of the metal foil layer 40, the laminating adhesive layer 50, and the polymer film layer 60, and installation is a peel-and-stick process, like an applique.

In yet another version, as shown in FIGS. 1, 2, and discussed below with regard to FIGS. 6A-6C, the adhesive layer 70 of the laminated hybrid metallized polymer film 10 may comprise a curable film adhesive layer (AL) 76 including a heat curable film adhesive layer (AL) 76*a*. Preferably, the curable film adhesive layer 76, such as the heat curable film adhesive layer 76*a*, comprises epoxy film adhesives, such as toughened epoxy structural film adhesives, or another suitable film adhesive. Preferably, the epoxy film adhesives, such as the toughened epoxy structural film adhesives, provide high strength permanent structural bonds that are resistant to harsh environments and provide high durability. The heat curable film adhesive layer 76*a* preferably requires heat activation for cure and vacuum bagging for bond strength. The curable film adhesive layer 76, such as the heat curable film adhesive layer 76*a*, may be supplied as part of the hybrid metal film portion 80 (see FIG. 2), or may be a separate material used for installation.

The effective elevated temperature for heating and curing the heat curable film adhesive layer 76*a* (see FIGS. 1-2) and the hybrid metal film portion 80 (see FIG. 2) is preferably in a range of from 200° F. (two-hundred degrees Fahrenheit) to 350° F. (three-hundred fifty degrees Fahrenheit), and more preferably, in a range of from 200° F. (two-hundred degrees Fahrenheit) to 275° F. (two-hundred seventy-five degrees Fahrenheit), and most preferably, at a temperature of 250° F. (two-hundred fifty degrees Fahrenheit). The effective period of time for heating and curing the heat curable film adhesive layer 76*a* (see FIGS. 1-2) and the hybrid metal film portion 80 (see FIG. 2) is preferably in a range of from 30 (thirty) minutes to about 4 (four) hours, depending on the temperature used for heating and curing, and more preferably. Preferably, the heating and curing takes place under vacuum, such as vacuum bagging. The effective pressure for heating and curing the heat curable film adhesive layer 76*a* (see FIGS. 1-2) and the hybrid metal film portion 80 (see FIG. 2) is preferably in a range of from 2 psi (two pounds per square inch) to 80 (eighty) psi, and more preferably, in a range of from 5 (five) psi to 20 (twenty) psi. The temperature, pressure, and time selected for the heating and curing is preferably selected based on the type of heat curable film adhesive layer 76*a* used.

Preferably, the adhesive layer 70 has a thickness 78 in a range of from 0.002 inch (2 mils) to 0.020 inch (20 mils). More preferably, the adhesive layer 70 has a thickness 78 in a range of from 0.005 inch (5 mils) to 0.010 inch (10 mils).

As shown in FIGS. 1, 2 the metal foil layer 40, the laminating adhesive layer 50, the polymer film layer 60, and the adhesive layer 70 form the laminated hybrid metallized polymer film 10. The metal foil layer 40, the laminating adhesive layer 50, and the polymer film layer 60 comprise the hybrid metal film portion 80 (see FIG. 2) of the laminated hybrid metallized polymer film 10, and the adhesive layer 70 comprises a bonding adhesive portion 81 (see FIG. 2) of the laminated hybrid metallized polymer film 10. The bonding adhesive portion 81 bonds, or is configured to bond, the hybrid metal film portion 80 to the surface 26, such as the substrate surface 28, of the composite structure 22, such as the aircraft composite structure 24.

As shown in FIG. 2, in another version of the disclosure, there is provided the system 12 for erosion protection 14, such as erosion edge protection 14*a*, of a composite structure 22, such as an aircraft composite structure 24, for example, when the composite structure 22, such as the aircraft composite structure 24, is exposed to one or more erosion conditions 16, such as an airstream 18, for example, an external airstream 18*a*.

As shown in FIG. 2, the system 12 comprises the composite structure 22, such as the aircraft composite structure 24. The aircraft composite structure 24 (see FIG. 2) may comprise an aircraft composite part 24*a* (see FIG. 2), for example, a carbon fiber reinforced plastic (CFRP) part 24*b* (see FIG. 2), or a composite laminate 24*c* (see FIG. 2). As shown in FIG. 2, the system 12 further comprises the surface 26, such as the substrate surface 28, of the composite structure 22, such as the aircraft composite structure 24. The composite structure 22, such as the aircraft composite structure 24, may have surfaces 26, such as the substrate surfaces 28, comprising curved surfaces 84, that each have a curved configuration 82 (see FIG. 2) with a complex curvature 83 (see FIG. 2). Installation or application of the laminated hybrid metallized polymer film 10 on such curved surfaces 84 is facilitated due to the formability of the laminated hybrid metallized polymer film 10.

As shown in FIG. 2, the surface 26, such as the substrate surface 28, of the composite structure 22, such as the aircraft composite structure 24, may have one or more edges 86, such as one or more leading edges 86*a*. The one or more edges 86 may include one or more cut edges 86*b* (see FIG. 2) with corners 88 (see FIG. 2), where the cut edges 86*b* and/or the corners 88 may protrude and may need to be covered with the laminated hybrid metallized polymer film 10, to protect against erosion conditions 16, and to prevent or minimize delamination 20 (see FIG. 2) of the one or more cut edges 86*b*. As shown in FIG. 2, the laminated hybrid metallized polymer film 10 is preferably used on surfaces 26, such as the substrate surfaces 28, for example, a prepared substrate surfaces 28*a*, of one or more edges 86, such as one or more leading edges 86*a*, of composite structures 22, such as aircraft composite structures 24. As shown in FIG. 2, the leading edges 86*a* may include leading edges 86*a* of wing panels 90, barrel sections 92, passenger doors 94, access doors 96, window surrounds 98, horizontal stabilizers 100, and vertical stabilizers 102 of air vehicles 160 (see FIG. 7), such as aircraft 160*a* (see FIG. 7).

The surface 26, such as the substrate surface 28, may be prepared or treated with one or more surface treatment processes 104 (see FIG. 2), prior to application of the laminated hybrid metallized polymer film 10, to obtain the prepared substrate surface 28*a* (see FIG. 2). The one or more surface treatment processes 104 (see FIG. 2) may facilitate adhesion of the laminated hybrid metallized polymer film 10 to the surface 26, such as the substrate surface 28.

As shown in FIG. 2, the system 12 may further comprise an edge seal layer 108 that may optionally be applied over and to the surface 26, such as the substrate surface 28, to become part of the prepared substrate surface 28*a*, prior to the laminated hybrid metallized polymer film 10 being applied over and to the surface 26, such as the substrate surface 28. The edge seal layer 108 comprises an edge seal material 110 that may comprise urethanes, thioethers, epoxies, polysulfides, or another suitable edge seal material 110. The edge seal layer 108 may be applied to, and smoothed over, the surface 26, such as the substrate surface 28. The edge seal layer 108 is preferably applied using an edge seal application process 112 (see FIG. 2). After the edge seal layer 108 is applied to the surface 26, such as the substrate surface 28, the edge seal layer 108 may be cleaned and prepared for application of a primer layer 114 (see FIG. 2), or alternatively, for direct application of the laminated hybrid metallized polymer film 10.

Preferably, the edge seal layer 108 has a thickness 113 (see FIG. 2) in a range of from 0.0005 inch (0.5 mil) to 0.030 inch (30 mils). More preferably, the edge seal layer 108 has a thickness 113 in a range of from 0.001 inch (1 mil) to 0.005 inch (5 mils).

As shown in FIG. 2, the system 12 may further comprise the primer layer 114 that may be optionally applied over and to the edge seal layer 108, prior to the laminated hybrid metallized polymer film 10 being applied over and to the surface 26, such as the substrate surface 28, and to become part of the prepared substrate surface 28*a*. The primer layer 114 may comprise a primer material 116 comprising a bond primer or an exterior primer, for example, an epoxy-based primer system, including a two-part system or a one-part system. The two-part system may comprise a urethane compatible epoxy primer, or another suitable two-part system. The one-part system may comprise an adhesive bond primer including a heat-curing adhesive bond primer, may comprise a corrosion inhibiting primer including a chromate-based modified epoxy primer, or may comprise another suitable one-part system. The epoxy-based primer system may contain corrosion inhibiting pigments, and some may be specifically formulated for composites.

The primer layer 114 is preferably applied with a primer application process 118 (see FIG. 2). After the primer layer 114 is applied to and over the edge seal layer 108, the primer layer 114 may be cleaned and prepared for application of the laminated hybrid metallized polymer film 10.

In another version, the primer layer 114 may be applied directly to and over the surface 26, such as the substrate surface 28, without using the edge seal layer 108. In yet another version, neither the edge seal layer 108 nor the primer layer 114 is used, and the laminated hybrid metallized polymer film 10 is applied directly to the surface 26, such as the substrate surface 28, for example, the prepared substrate surface 28*a*, of the composite structure 22, such as the aircraft composite structure 24.

Preferably, the primer layer 114 has a thickness 119 (see FIG. 2) in a range of from 0.001 inch (1 mil) to 0.020 inch (20 mils). More preferably, the primer layer 114 has a thickness 119 in a range of from 0.005 inch (5 mils) to 0.010 inch (10 mils).

The system 12 (see FIG. 2) comprises one or more versions of the laminated hybrid metallized polymer film 10, as discussed above, applied over and to the surface 26, such as the substrate surface 28, for example, the prepared substrate surface 28*a*, of the composite structure 22, such as the aircraft composite structure 24, with or without the edge seal layer 108 and/or the primer layer 114.

As discussed above, and as shown in FIG. 2, the laminated hybrid metallized polymer film 10 comprises the metal foil layer 40. As shown in FIG. 1, the metal foil layer 40 preferably comprises a titanium foil layer 40*a*, a titanium alloy foil layer 40*b*, a nickel foil layer 40*c*, a nickel alloy foil layer 40*d*, a stainless steel foil layer 40*e*, a stainless steel alloy foil layer 40*f*, an aluminum foil layer 40*g*, an aluminum alloy foil layer 40*h*, a copper foil layer 40*i*, a copper alloy foil layer 40*j*, or another suitable metal foil layer 40. More preferably, the metal foil layer 40 comprises the titanium foil layer 40*a*.

As discussed above, and as shown in FIG. 2, the laminated hybrid metallized polymer film 10 further comprises the laminating adhesive layer 50 underlying the metal foil layer 40. As shown in FIG. 1, the laminating adhesive layer 50 may comprise a urethane adhesive layer 50*a* including a polyurethane adhesive layer 50*b*, an epoxy adhesive layer 50*c*, a polysiloxane adhesive layer 50*d*, a silicone adhesive layer 50*e*, an acrylic adhesive layer 50*f*, or another suitable laminating adhesive layer 50.

As discussed above, and as shown in FIG. 2, the laminated hybrid metallized polymer film 10 further comprises the polymer film layer 60 underlying the laminating adhesive layer 50. The polymer film layer 60 is laminated to the metal foil layer 40 with the laminating adhesive layer 50, and the laminating adhesive layer 50 is coupled between the metal foil layer 40 and the polymer film layer 60. As shown in FIG. 1, the polymer film layer 60 may comprise a polyether ether ketone (PEEK) film layer 60*a*, a polyester film layer 60*b*, a polyethylene terephthalate (PET) film layer 60*c*, a polypropylene (PP) film layer 60*d*, a polyethylene (PE) film layer 60*e*, a polytrimethylene terephthalate (PTT) film layer 60*f*, a polyamide (PA) film layer 60*g*, a polyetherimide (PEI) film layer 60*h*, a polyvinyl chloride (PVC) film layer 60*i*, a polycarbonate (PC) film layer 60*j*, a nylon film layer 60*k*, a polyetherketoneketone (PEKK) film layer 60*l*, a polyphenylsulfone (PPSU) film layer 60*m*, a polyphenylene sulfide (PPS) film layer 60*n*, an ethylene chlorotrifluoroethylene (ECTFE) film layer 60*o*, a polyvinylidene fluorine (PVDF) film layer 60*p*, or another suitable polymer film layer 60.

As discussed above, and as shown in FIG. 2, the laminated hybrid metallized polymer film 10 further comprises the adhesive layer 70 underlying the polymer film layer 60.

The adhesive layer 70 adheres the polymer film layer 60 to the surface 26 (see FIG. 2), such as the substrate surface 28 (see FIG. 2) of the composite structure 22 (see FIG. 2), such as the aircraft composite structure 24 (see FIG. 2).

In one version, as shown in FIG. 2, and discussed below with regard to FIGS. 4A-4C, the adhesive layer 70 of the laminated hybrid metallized polymer film 10 may comprise the sealant adhesive layer 72 including the polythioether sealant adhesive layer 72a, the polysulfide sealant adhesive layer 72b, or another suitable sealant adhesive layer 72. In another version, as shown in FIG. 2, and discussed below with regard to FIGS. 5A-5C, the adhesive layer 70 of the laminated hybrid metallized polymer film 10 may comprise the pressure sensitive adhesive (PSA) layer 74. In yet another version, as shown in FIG. 2, and discussed below with regard to FIGS. 6A-6C, the adhesive layer 70 of the laminated hybrid metallized polymer film 10 may comprise the curable film adhesive layer 76 including the heat curable film adhesive layer 76a.

As shown in FIG. 2, the metal foil layer 40, the laminating adhesive layer 50, the polymer film layer 60, and the adhesive layer 70 form the laminated hybrid metallized polymer film 10. The laminated hybrid metallized polymer film 10 is preferably applied over and to the surface 26 (see FIG. 2), such as the substrate surface 28 (see FIG. 2) of the composite structure 22 (see FIG. 2), such as the aircraft composite structure 24 (see FIG. 2). When the composite structure 22, such as the aircraft composite structure 24, is exposed to one or more erosion conditions 16 (see FIG. 2), the laminated hybrid metallized polymer film 10 applied over and to the surface 26, such as the substrate surface 28, provides erosion protection 14 (see FIG. 2), such as erosion edge protection 14a (see FIG. 2), of the composite structure 22, such as the aircraft composite structure 24, from the one or more erosion conditions 16, such as an airstream 18 (see FIG. 2), for example, an external airstream 18a (see FIG. 2).

When the composite structure 22, such as the aircraft composite structure 24, is exposed to the erosion condition 16, such as the airstream 18, for example, the external airstream 18a, the laminated hybrid metallized polymer film 10 applied over and to the surface 26, such as the substrate surface 28, prevents or minimizes delamination 20 (see FIG. 2) of the one or more cut edges 86b (see FIG. 2) of the surface 26, such as the substrate surface 28, of the composite structure 22, such as the aircraft composite structure 24, and provides erosion protection 14 (see FIG. 2) of the composite structure 22, such as the aircraft composite structure 24, from the erosion condition 16, such as the airstream 18.

Now referring to FIGS. 3A-3E, various configurations 46 of the metal foil layer 40 are shown. Depending on how and where the laminated hybrid metallized polymer film 10 is applied to the surface 26 (see FIG. 2), such as the substrate surface 28 (see FIG. 2), for example, the prepared substrate surface 28a (see FIG. 2), of the composite structure 22, such as the aircraft composite structure 24, the metal foil layer 40 may be processed or modified prior to forming the laminated hybrid metallized polymer film 10. For example, for composite structures 22, such as the aircraft composite structures 24, with curved surfaces 84 (see FIG. 2) having a curved configuration 82 (see FIG. 2) with a complex curvature 83 (see FIG. 2), it may be desirable to prepare or modify the metal foil layer 40 to facilitate application and fitting of the laminated hybrid metallized polymer film 10 around and over such curved surfaces 84.

Figure 3A:
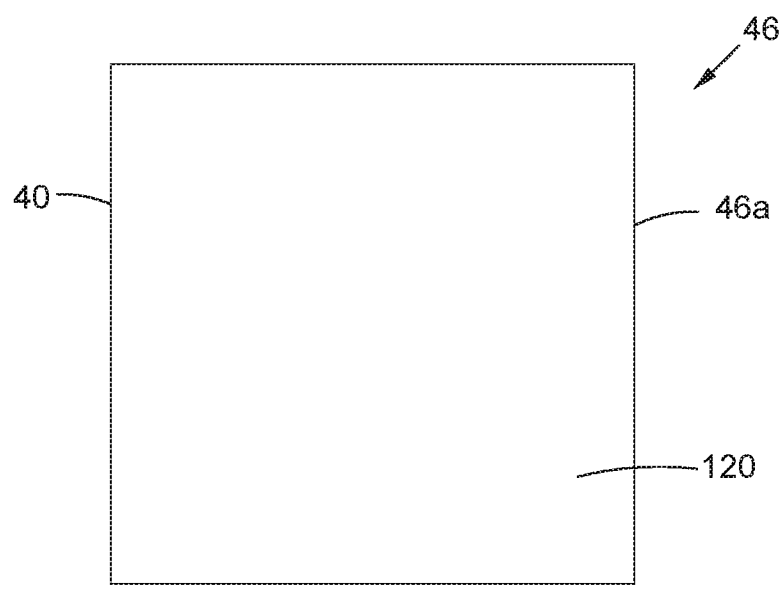
FIG. 3A is an illustration of a top view of a metal foil layer with a configuration comprising a plain metal foil that may be used in a version of a laminated hybrid metallized polymer film of the disclosure.

FIG. 3A is an illustration of a top view of the metal foil layer 40 having a configuration 46 comprising a plain metal foil 46a that may be used in a version of the laminated hybrid metallized polymer film 10 (see FIG. 1) of the disclosure. The plain metal foil 46a, shown in FIG. 2A, has not been processed or modified further and has a closed continuous surface 120 without any slots, perforations, openings, or patterns.

Figure 3B:
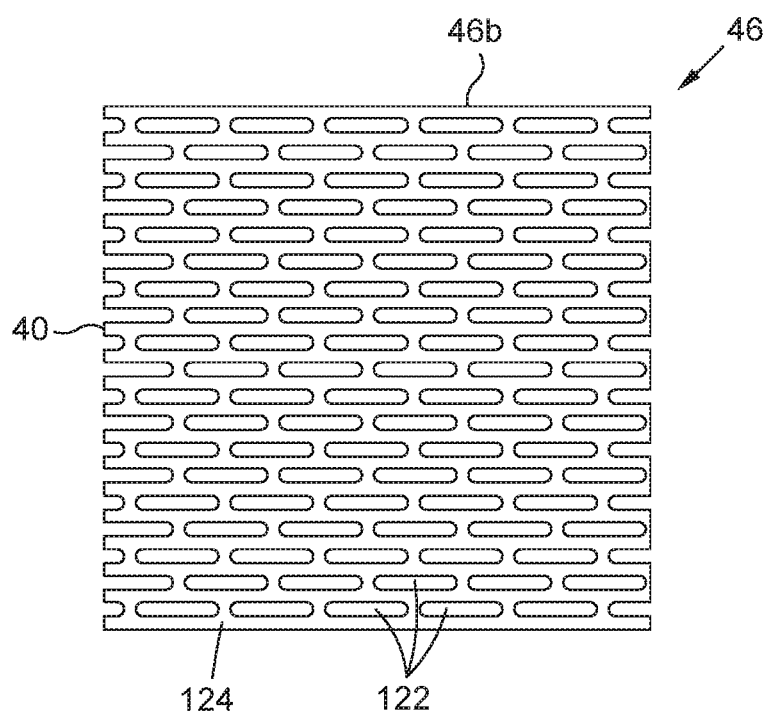
FIG. 3B is an illustration of a top view of a metal foil layer with a configuration comprising a slotted metal foil that may be used in a version of a laminated hybrid metallized polymer film of the disclosure.

FIG. 3B is an illustration of a top view of the metal foil layer 40 with a configuration 46 comprising a slotted metal foil 46b that may be used in a version of a laminated hybrid metallized polymer film 10 (see FIG. 1) of the disclosure. As shown in FIG. 3B, the slotted metal foil 46b has a plurality of slots 122 formed through a surface 124 of the slotted metal foil 46b. The slotted metal foil 46b may be formed by cutting with a slot cutting apparatus the plurality of slots 122, or elongated holes, in a staggered or side-by-side pattern, or another suitable pattern.

Figure 3C:
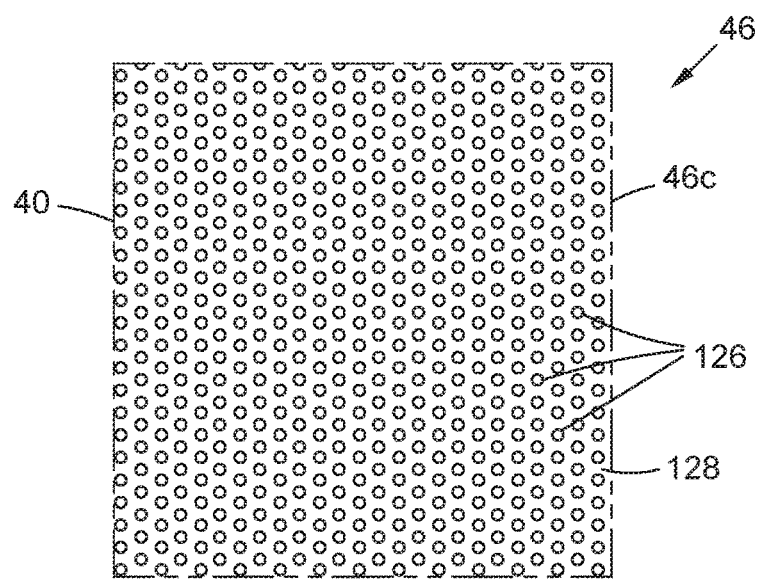
FIG. 3C is an illustration of a top view of a metal foil layer with a configuration comprising a perforated metal foil that may be used in a version of a laminated hybrid metallized polymer film of the disclosure.

FIG. 3C is an illustration of a top view of the metal foil layer 40 with a configuration 46 comprising a perforated metal foil 46c that may be used in a version of a laminated hybrid metallized polymer film 10 (see FIG. 1) of the disclosure. As shown in FIG. 3C, the perforated metal foil 46c has a plurality of perforations 126 formed through a surface 128 of the perforated metal foil 46c. The perforated metal foil 46c may be formed by cutting or punching with a hole cutting machine the plurality of perforations 126, or holes, in straight rows or a staggered pattern, or another suitable pattern.

Figure 3D:
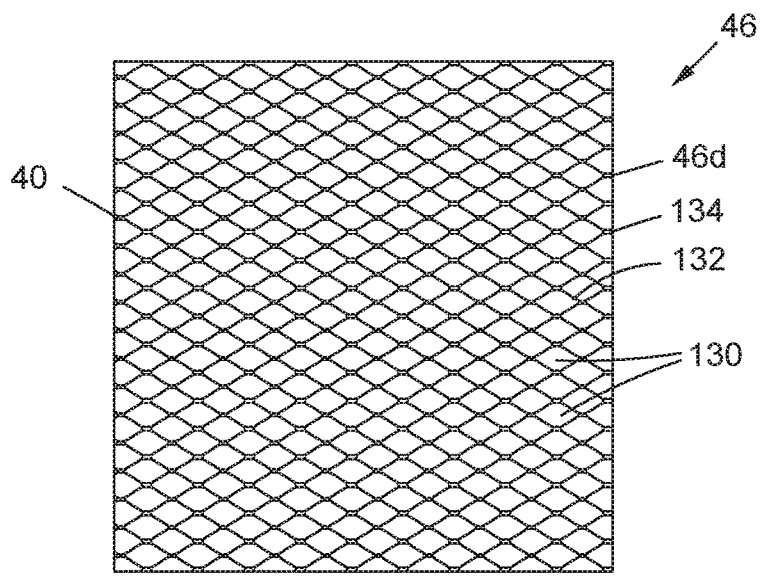
FIG. 3D is an illustration of a top view of a metal foil layer with a configuration comprising an expanded metal foil that may be used in a version of a laminated hybrid metallized polymer film of the disclosure.

FIG. 3D is an illustration of a top view of the metal foil layer 40 with a configuration 46 comprising an expanded metal foil 46d that may be used in a version of a laminated hybrid metallized polymer film 10 (see FIG. 1) of the disclosure. As shown in FIG. 3D, the expanded metal foil 46d has a plurality of openings 130 in a diamond-shaped pattern 132 formed through a surface 134 of the expanded metal foil 46d. The expanded metal foil 46d may be formed by cutting with a slot cutting machine multiple slits in the metal foil layer 40, and then stretching the metal foil layer 40 that has been cut, to form the diamond-shaped pattern 132.

Figure 3E:
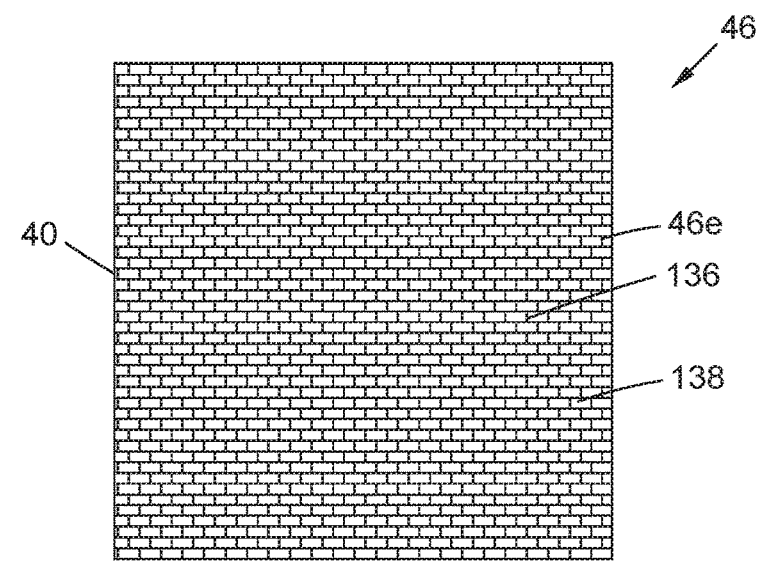
FIG. 3E is an illustration of a top view of a metal foil layer with a configuration comprising a mesh metal foil that may be used in a version of a laminated hybrid metallized polymer film of the disclosure.

FIG. 3E is an illustration of a top view of the metal foil layer 40 with a configuration 46 comprising a mesh metal foil 46e that may be used in a version of a laminated hybrid metallized polymer film 10 (see FIG. 1) of the disclosure. As shown in FIG. 3E, the mesh metal foil 46e has a woven mesh pattern 136 formed on, or in, a surface 138 of the mesh metal foil 46e with a metal mesh forming machine.

Figure 4A:
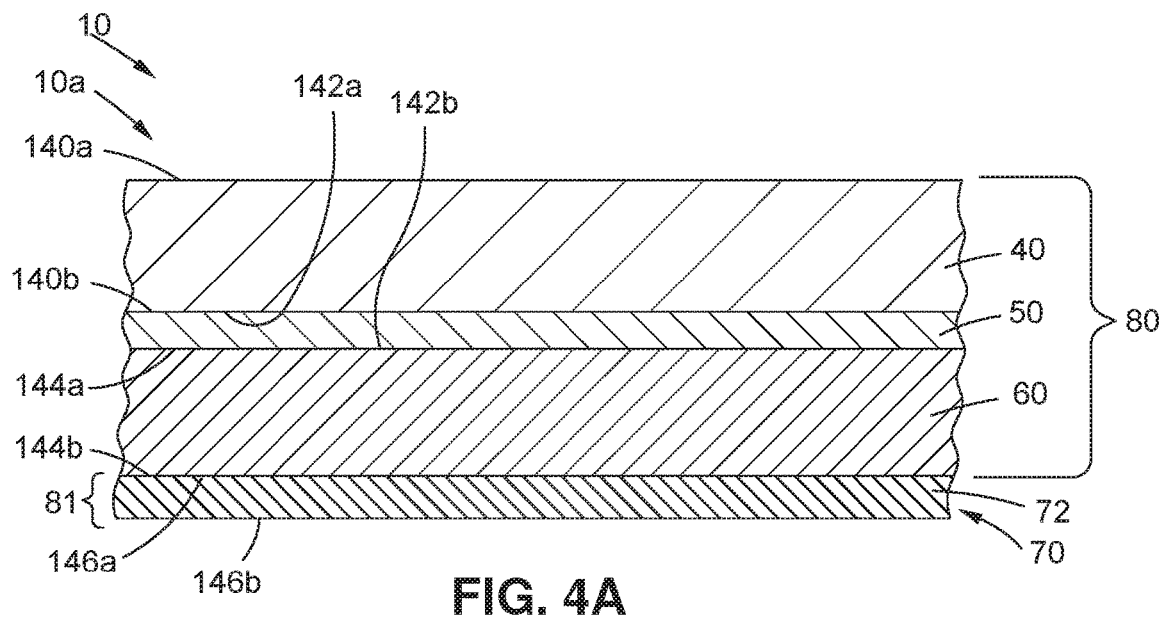
FIG. 4A is a schematic cross-sectional side view of an exemplary version of a laminated hybrid metallized polymer film of the disclosure.
Figure 4B:
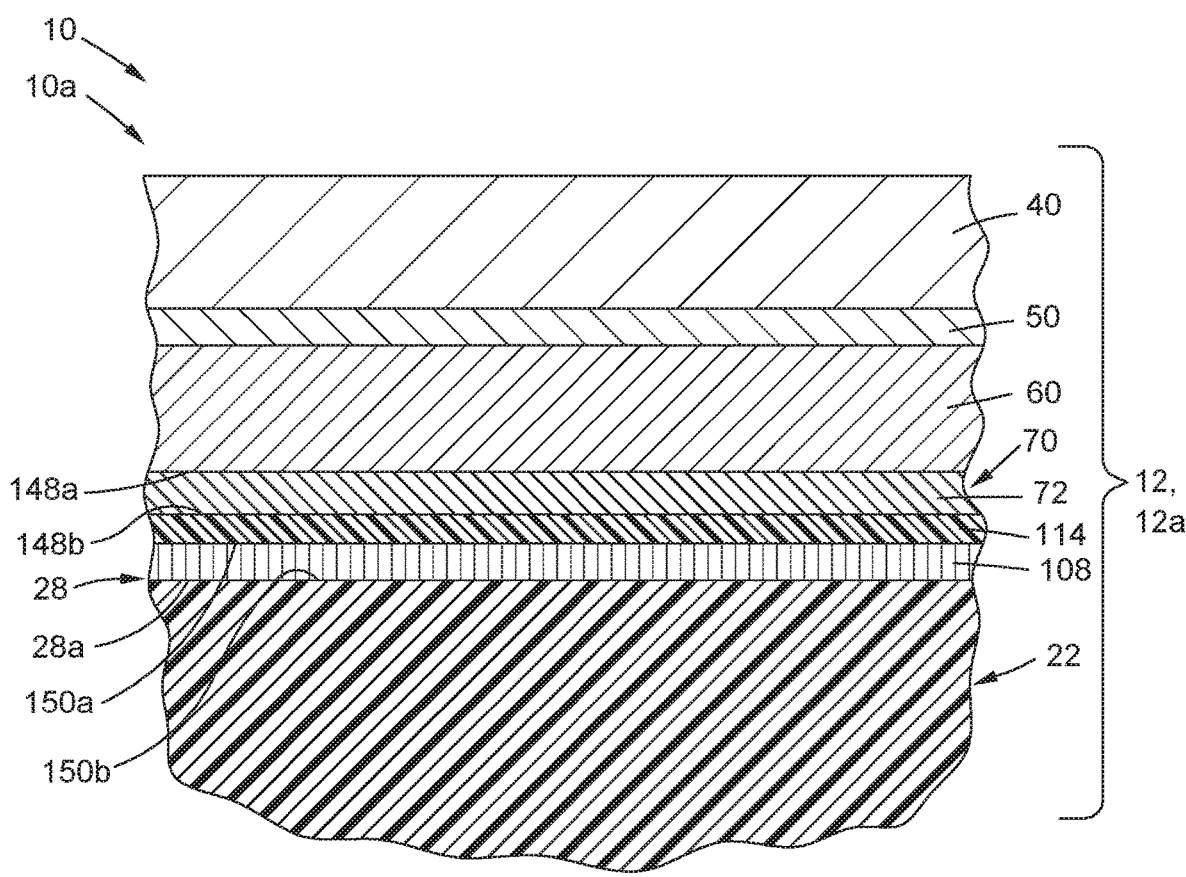
FIG. 4B is a schematic cross-sectional side view of the laminated hybrid metallized polymer film of FIG. 4A applied to a version of substrate surface.
Figure 4C:
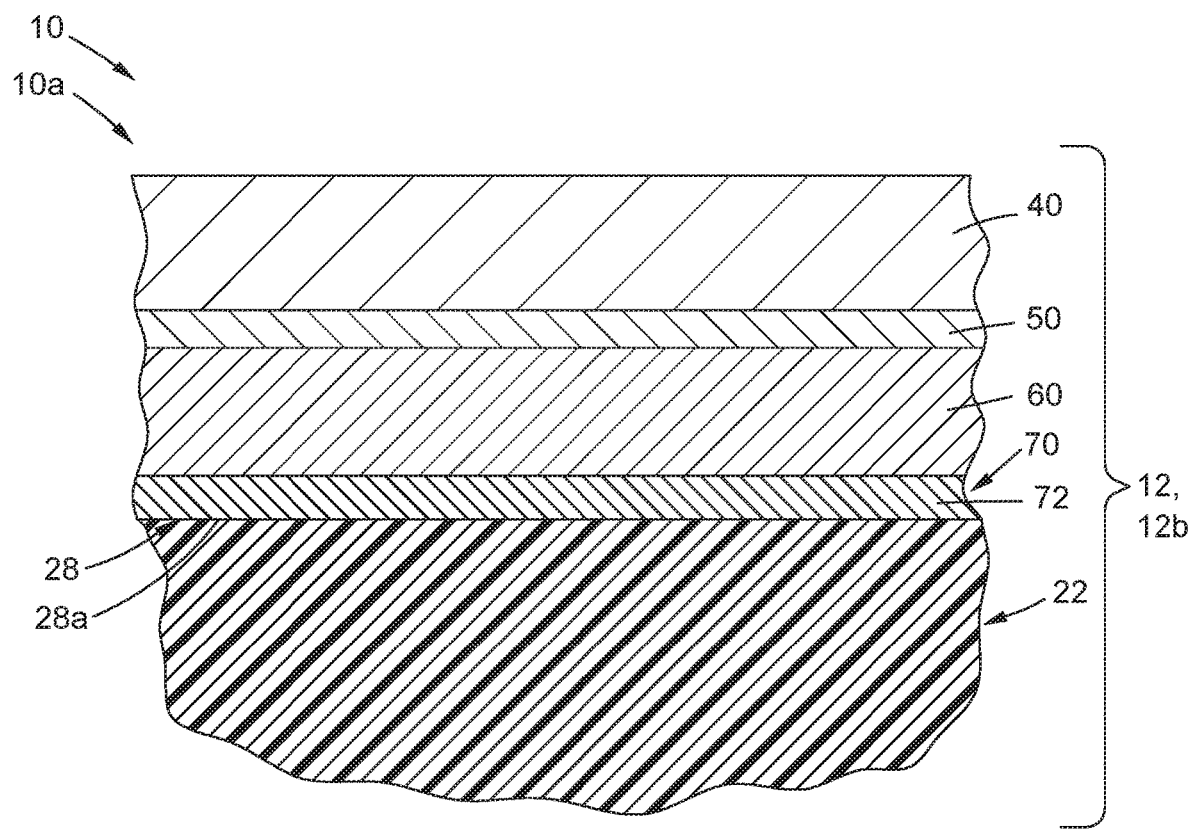
FIG. 4C is a schematic cross-sectional side view of the laminated hybrid metallized polymer film of FIG. 4A applied to another version of a substrate surface.

Now referring to FIGS. 4A-4C, FIG. 4A is a schematic cross-sectional side view of an exemplary version of a laminated hybrid metallized polymer film 10, such as in the form of laminated hybrid metallized polymer film 10a, of the disclosure. FIG. 4B is a schematic cross-sectional side view of the laminated hybrid metallized polymer film 10, such as in the form of laminated hybrid metallized polymer film 10a, of FIG. 4A, applied to a version of a substrate surface 28, such as a prepared substrate surface 28a. FIG. 4C is a schematic cross-sectional side view of the laminated hybrid metallized polymer film 10, such as in the form of laminated hybrid metallized polymer film 10a, of FIG. 4A, applied to another version of a substrate surface 28, such as the prepared substrate surface 28a.

As shown in FIGS. 4A-4C, the laminated hybrid metallized polymer film 10, such as in the form of laminated hybrid metallized polymer film 10a, comprises the metal foil layer 40, the laminating adhesive layer 50, the polymer film layer 60, and the adhesive layer 70, where the adhesive layer 70 comprises a sealant adhesive layer 72. The sealant adhesive layer 72 (see FIG. 4A) may comprise a polythioether sealant adhesive layer 72a (see FIG. 1), a polysulfide sealant adhesive layer 72b (see FIG. 1), or another suitable sealant adhesive layer 72.

As shown in FIG. 4A, the metal foil layer 40 has a first side 140a and a second side 140b, the laminating adhesive layer 50 has a first side 142a and a second side 142b, the polymer film layer 60 has a first side 144a and a second side 144b, and the adhesive layer 70, such as the sealant adhesive layer 72, has a first side 146a and a second side 146b. As shown in FIG. 4A, the second side 140b of the metal foil layer 40 is adjacent to, and coupled or attached to, the first side 142a of the laminating adhesive layer 50, and the second side 142b of the laminating adhesive layer 50 is adjacent to, and coupled or attached to, the first side 144a of the polymer film layer 60. As further shown in FIG. 4A, the second side 144b of the polymer film layer 60 is adjacent to, and coupled or attached to, the first side 146a of the sealant adhesive layer 72.

FIG. 4B shows the system 12, such as in the form of system 12a, comprising the laminated hybrid metallized polymer film 10, such as in the form of laminated hybrid metallized polymer film 10a, and the composite structure 22 with the substrate surface 28, such as the prepared substrate surface 28a. FIG. 4B further shows the edge seal layer 108 applied over and to the substrate surface 28, and shows the primer layer 114 applied over and to the edge seal layer 108. As shown in FIG. 4B, the primer layer 114 has a first side 148a and a second side 148b, and the edge seal layer 108 has a first side 150a and a second side 150b.

As shown in FIG. 4B, laminated hybrid metallized polymer film 10, such as in the form of laminated hybrid metallized polymer film 10a, is applied directly to the primer layer 114. The second side 146b (see FIG. 4A) of the sealant adhesive layer 72 (see FIGS. 4A, 4B) is adjacent to, and coupled or attached to, the first side 148a of the primer layer 114. As shown in FIG. 4B, the second side 148b of the primer layer 114 is adjacent to, and coupled or attached to, the first side 150a of the edge seal layer 108, and the second side 150b of the edge seal layer 108 is adjacent to, and coupled or attached to, the substrate surface 28, such as the prepared substrate surface 28a, of the composite structure 22.

FIG. 4C shows the system 12, such as in the form of system 12b, comprising the laminated hybrid metallized polymer film 10, such as in the form of laminated hybrid metallized polymer film 10a, and the composite structure 22 with the substrate surface 28, such as the prepared substrate surface 28a, but with no primer layer 114 (see FIG. 4B) and with no edge seal layer 108 (see FIG. 4B) on the substrate surface 28. FIG. 4C shows the laminated hybrid metallized polymer film 10, such as in the form of laminated hybrid metallized polymer film 10a, applied directly to the substrate surface 28, such as the prepared substrate surface 28a. The second side 146b (see FIG. 4A) of the sealant adhesive layer 72 (see FIGS. 4A, 4B) is adjacent to, and coupled or attached to, the substrate surface 28, such as the prepared substrate surface 28a, of the composite structure 22.

Figure 5A:
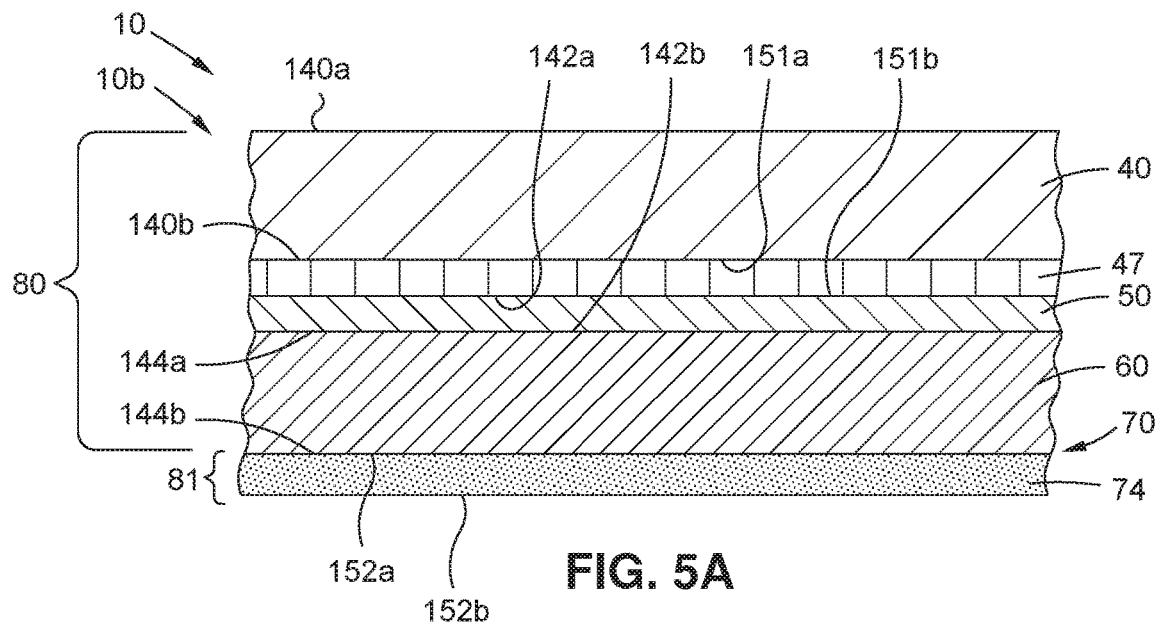
FIG. 5A is a schematic cross-sectional side view of another exemplary version of a laminated hybrid metallized polymer film of the disclosure.
Figure 5B:
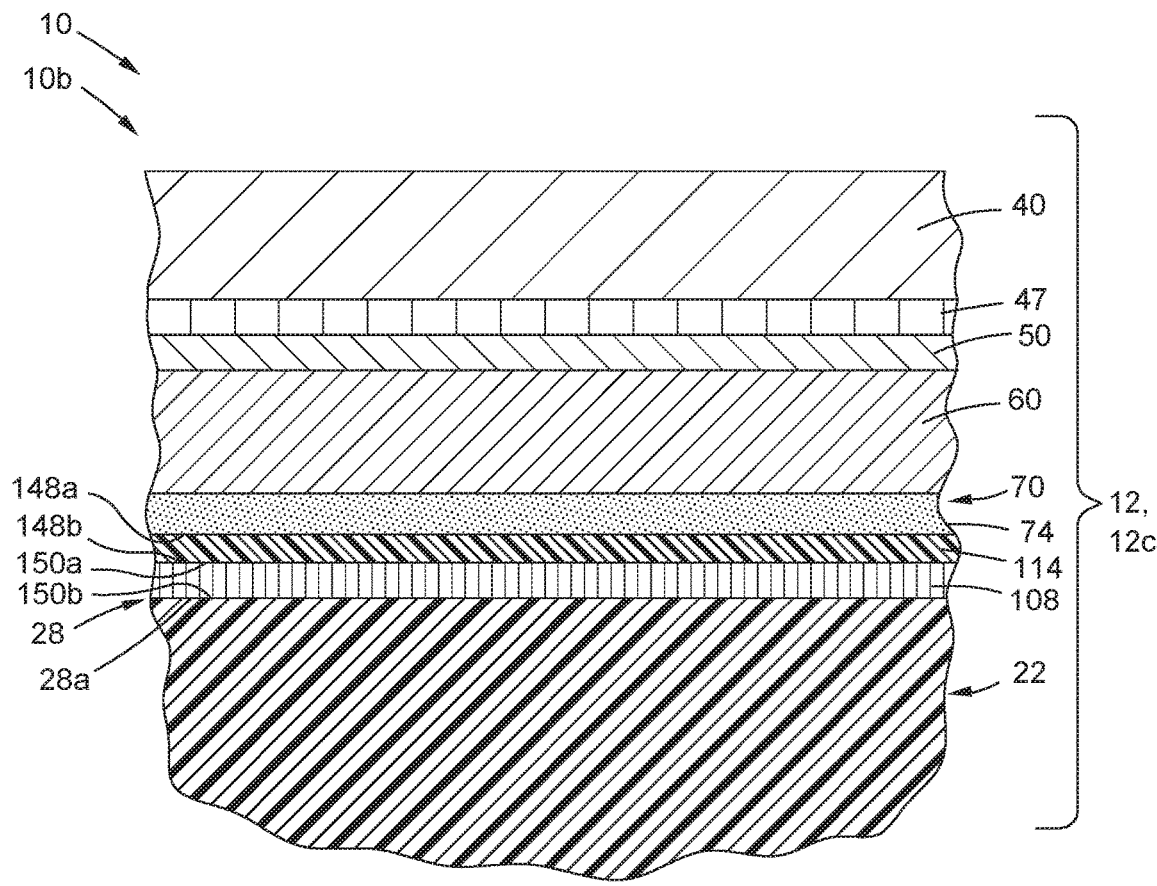
FIG. 5B is a schematic cross-sectional side view of the laminated hybrid metallized polymer film of FIG. 5A applied to a version of a substrate surface.
Figure 5C:
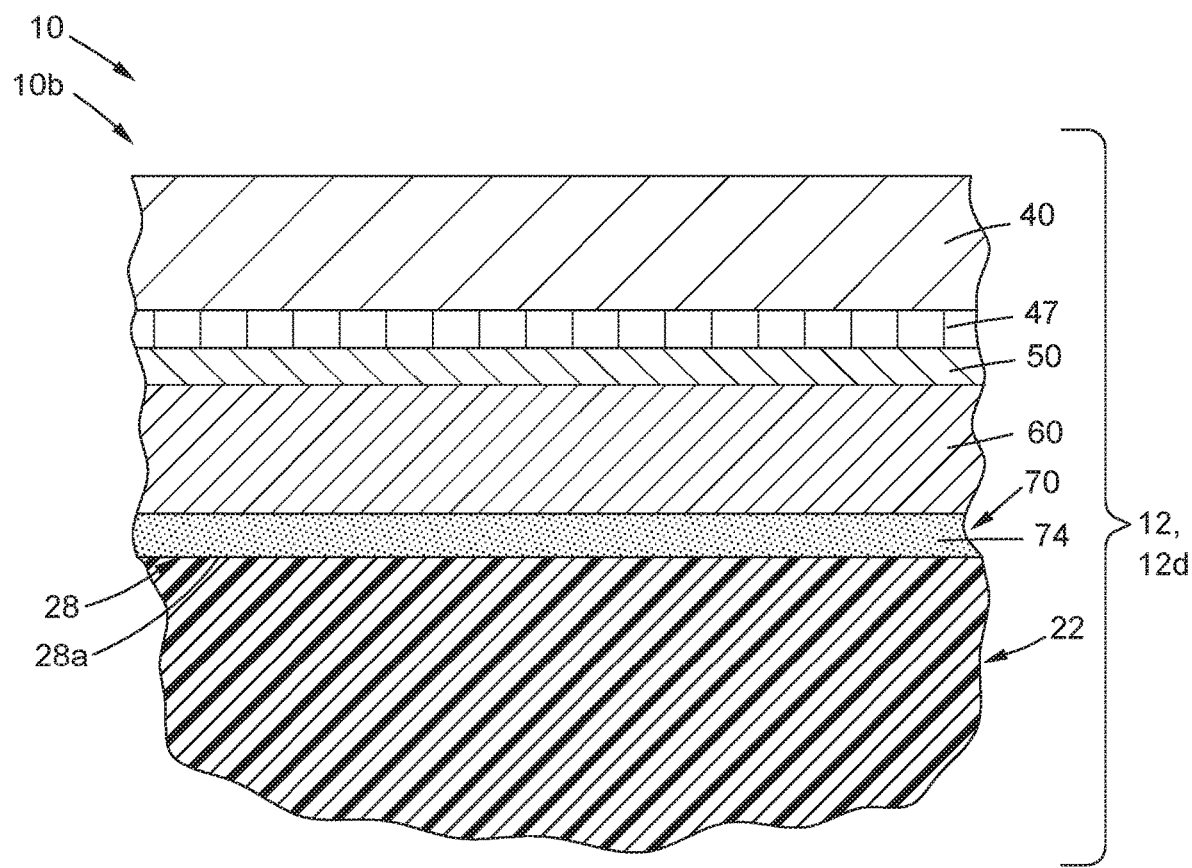
FIG. 5C is a schematic cross-sectional side view of the laminated hybrid metallized polymer film of FIG. 5A applied to another version of a substrate surface.

Now referring to FIGS. 5A-5C, FIG. 5A is a schematic cross-sectional side view of another exemplary version of a laminated hybrid metallized polymer film 10, such as in the form of laminated hybrid metallized polymer film 10b, of the disclosure. FIG. 5B is a schematic cross-sectional side view of the laminated hybrid metallized polymer film 10, such as in the form of laminated hybrid metallized polymer film 10b, of FIG. 5A, applied to a version of a substrate surface 28, such as a prepared substrate surface 28a. FIG. 5C is a schematic cross-sectional side view of the laminated hybrid metallized polymer film 10, such as in the form of laminated hybrid metallized polymer film 10b, of FIG. 5A, applied to another version of a substrate surface 28, such as the prepared substrate surface 28a.

As shown in FIGS. 5A-5C, the laminated hybrid metallized polymer film 10, such as in the form of laminated hybrid metallized polymer film 10a, comprises the metal foil layer 40 that has been surface treated and primed with a primer layer 47, and comprises the laminating adhesive layer 50, the polymer film layer 60, and the adhesive layer 70, where the adhesive layer 70 comprises a pressure sensitive adhesive (PSA) layer 74. The PSA layer 74 (see FIG. 5B) comprising the bonding adhesive portion 81 (see FIG. 5B), is preferably pre-applied to the hybrid metal film portion 80 (see FIG. 5B), and installation is preferably a peel-and-stick process, for example, in the form 30 (see FIG. 1) of an applique 34 (see FIG. 1).

As shown in FIG. 5A, the metal foil layer 40 has the first side 140a and the second side 140b, the primer layer 47 of the metal foil layer 40 has a first side 151a and a second side 151b, the laminating adhesive layer 50 has the first side 142a and the second side 142b, the polymer film layer 60 has the first side 144a and the second side 144b, and the adhesive layer 70, such as the PSA layer 74, has a first side 152a and a second side 152b. As shown in FIG. 5A, the second side 140b of the metal foil layer 40 is adjacent to, and coupled or attached to, the first side 151a of the primer layer 47, and the second side 151b of the primer layer 47 is adjacent to, and coupled or attached to, the first side 142a of the laminating adhesive layer 50, and the second side 142b of the laminating adhesive layer 50 is adjacent to, and coupled or attached to, the first side 144a of the polymer film layer 60. As further shown in FIG. 5A, the second side 144b of the polymer film layer 60 is adjacent to, and coupled or attached to, the first side 152a of the PSA layer 74.

FIG. 5B shows the system 12, such as in the form of system 12c, comprising the laminated hybrid metallized polymer film 10, such as in the form of laminated hybrid metallized polymer film 10b, and the composite structure 22 with the substrate surface 28, such as the prepared substrate surface 28a. FIG. 5B further shows the edge seal layer 108 applied over and to the substrate surface 28, and shows the primer layer 114 applied over and to the edge seal layer 108. As shown in FIG. 5B, the primer layer 114 has the first side 148a and the second side 148b, and the edge seal layer 108 has the first side 150a and the second side 150b.

As shown in FIG. 5B, laminated hybrid metallized polymer film 10, such as in the form of laminated hybrid metallized polymer film 10b, is applied directly to the primer layer 114. The second side 152b (see FIG. 5A) of the PSA layer 74 (see FIGS. 5A, 5B) is adjacent to, and coupled or attached to, the first side 148a of the primer layer 114. As shown in FIG. 5B, the second side 148b of the primer layer 114 is adjacent to, and coupled or attached to, the first side 150a of the edge seal layer 108, and the second side 150b of the edge seal layer 108 is adjacent to, and coupled or attached to, the substrate surface 28, such as the prepared substrate surface 28a, of the composite structure 22.

FIG. 5C shows the system 12, such as in the form of system 12d, comprising the laminated hybrid metallized polymer film 10, such as in the form of laminated hybrid metallized polymer film 10b, and the composite structure 22 with the substrate surface 28, such as the prepared substrate surface 28a, but with no primer layer 114 (see FIG. 5B) and with no edge seal layer 108 (see FIG. 5B) on the substrate surface 28. FIG. 5C shows the laminated hybrid metallized polymer film 10, such as in the form of laminated hybrid metallized polymer film 10*b*, applied directly to the substrate surface 28, such as the prepared substrate surface 28*a*. The second side 152*b* (see FIG. 5A) of the PSA layer 74 (see FIGS. 5A, 5B) is adjacent to, and coupled or attached to, the substrate surface 28, such as the prepared substrate surface 28*a*, of the composite structure 22.

Figure 6A:
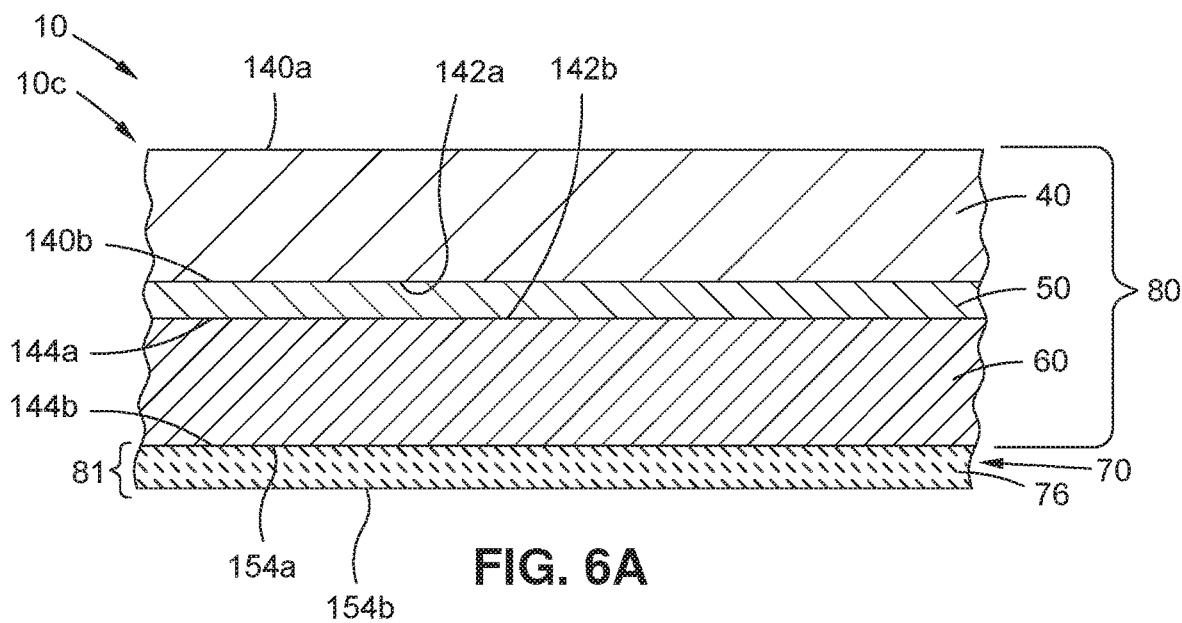
FIG. 6A is a schematic cross-sectional side view of yet another exemplary version of a laminated hybrid metallized polymer film of the disclosure.
Figure 6B:
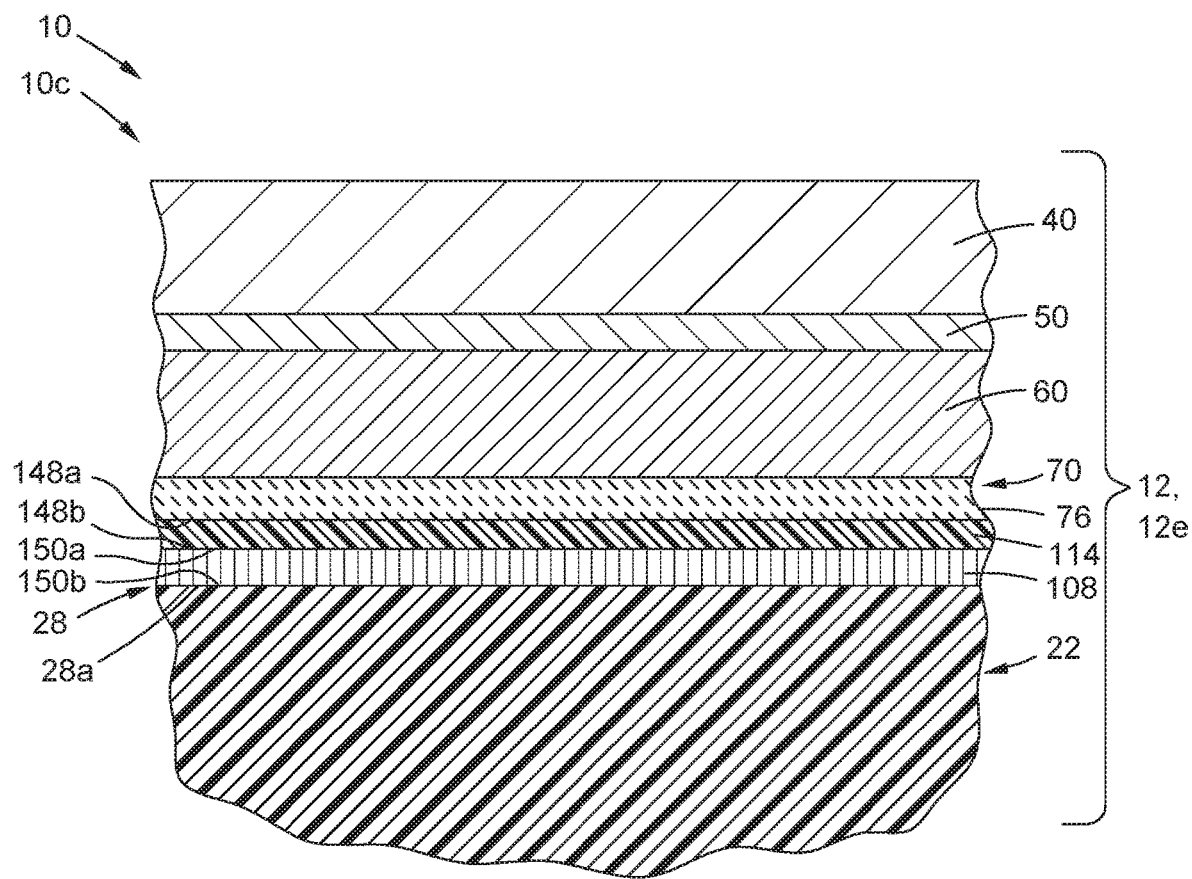
FIG. 6B is a schematic cross-sectional side view of the laminated hybrid metallized polymer film of FIG. 6A applied to a version of a substrate surface.
Figure 6C:
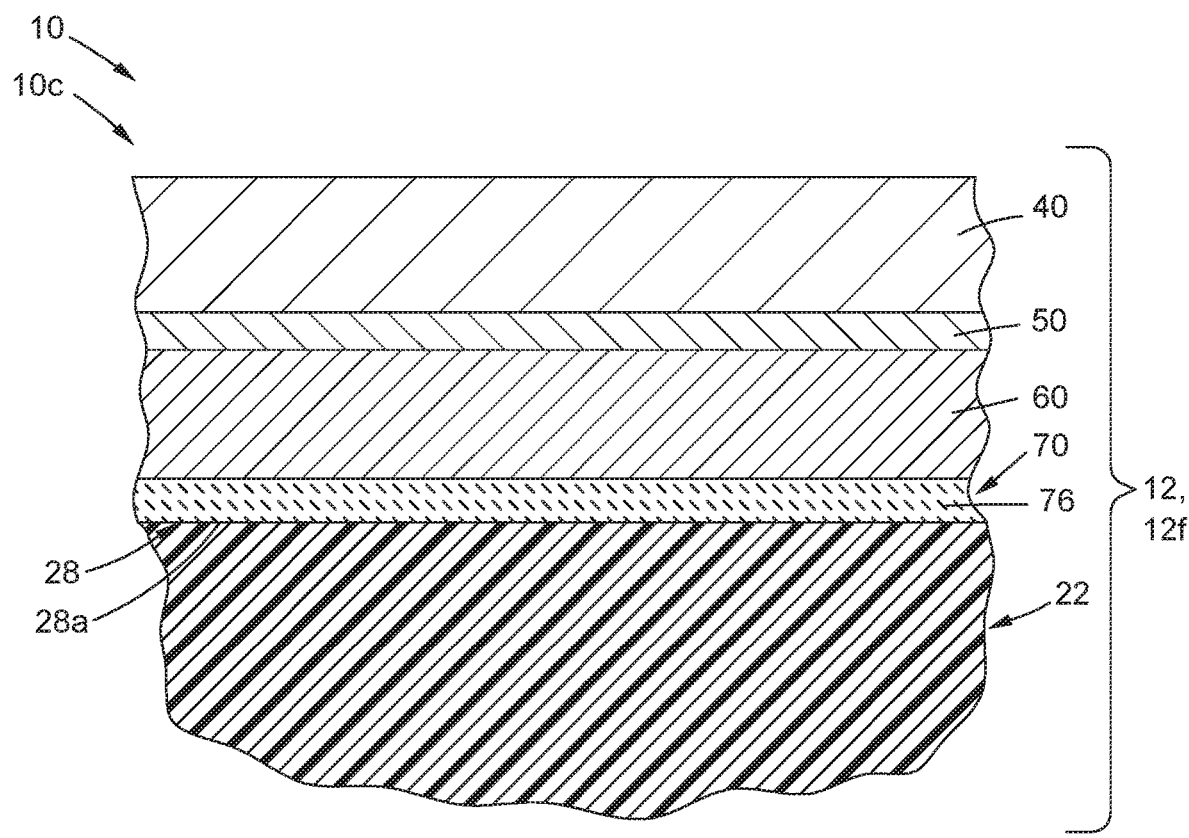
FIG. 6C is a schematic cross-sectional side view of the laminated hybrid metallized polymer film of FIG. 6A applied to another version of a substrate surface.

Now referring to FIGS. 6A-6C, FIG. 6A is a schematic cross-sectional side view of yet another exemplary version of a laminated hybrid metallized polymer film 10, such as in the form of laminated hybrid metallized polymer film 10*c*, of the disclosure. FIG. 6B is a schematic cross-sectional side view of the laminated hybrid metallized polymer film 10, such as in the form of laminated hybrid metallized polymer film 10*c*, of FIG. 6A, applied to a version of a substrate surface 28, such as a prepared substrate surface 28*a*. FIG. 6C is a schematic cross-sectional side view of the laminated hybrid metallized polymer film 10, such as in the form of laminated hybrid metallized polymer film 10*c*, of FIG. 6A, applied to another version of a substrate surface 28, such as the prepared substrate surface 28*a*.

As shown in FIGS. 6A-6C, the laminated hybrid metallized polymer film 10, such as in the form of laminated hybrid metallized polymer film 10*c*, comprises the metal foil layer 40, the laminating adhesive layer 50, the polymer film layer 60, and the adhesive layer 70, where the adhesive layer 70 comprises a curable film adhesive layer 76. The curable film adhesive layer 76 (see FIGS. 1, 6A) may comprise a heat curable film adhesive layer 76*a* (see FIG. 1), or another suitable curable film adhesive layer 76. The heat curable film adhesive layer 76*a* requires heat activation for cure and vacuum bagging for bond strength.

As shown in FIG. 6A, the metal foil layer 40 has the first side 140*a* and the second side 140*b*, the laminating adhesive layer 50 has the first side 142*a* and the second side 142*b*, the polymer film layer 60 has the first side 144*a* and the second side 144*b*, and the adhesive layer 70, such as the curable film adhesive layer 76, has a first side 154*a* and a second side 154*b*. As shown in FIG. 6A, the second side 140*b* of the metal foil layer 40 is adjacent to, and coupled or attached to, the first side 142*a* of the laminating adhesive layer 50, and the second side 142*b* of the laminating adhesive layer 50 is adjacent to, and coupled or attached to, the first side 144*a* of the polymer film layer 60. As further shown in FIG. 6A, the second side 144*b* of the polymer film layer 60 is adjacent to, and coupled or attached to, the first side 154*a* of the curable film adhesive layer 76.

FIG. 6B shows the system 12, such as in the form of system 12*e*, comprising the laminated hybrid metallized polymer film 10, such as in the form of laminated hybrid metallized polymer film 10*c*, and the composite structure 22 with the substrate surface 28, such as the prepared substrate surface 28*a*. FIG. 6B further shows the edge seal layer 108 applied over and to the substrate surface 28, and shows the primer layer 114 applied over and to the edge seal layer 108. As shown in FIG. 6B, the primer layer 114 has the first side 148*a* and the second side 148*b*, and the edge seal layer 108 has the first side 150*a* and the second side 150*b*.

As shown in FIG. 6B, laminated hybrid metallized polymer film 10, such as in the form of laminated hybrid metallized polymer film 10*c*, is applied directly to the primer layer 114. The second side 154*b* (see FIG. 6A) of the curable film adhesive layer 76 (see FIGS. 6A, 6B) is adjacent to, and coupled or attached to, the first side 148*a* of the primer layer 114. As shown in FIG. 6B, the second side 148*b* of the primer layer 114 is adjacent to, and coupled or attached to, the first side 150*a* of the edge seal layer 108, and the second side 150*b* of the edge seal layer 108 is adjacent to, and coupled or attached to, the substrate surface 28 of the composite structure 22.

FIG. 6C shows the system 12, such as in the form of system 12*f*, comprising the laminated hybrid metallized polymer film 10, such as in the form of laminated hybrid metallized polymer film 10*c*, and the composite structure 22 with the substrate surface 28, such as the prepared substrate surface 28*a*, but with no primer layer 114 (see FIG. 6B) and with no edge seal layer 108 (see FIG. 6B) on the substrate surface 28. FIG. 6C shows the laminated hybrid metallized polymer film 10, such as in the form of laminated hybrid metallized polymer film 10*c*, applied directly to the substrate surface 28, such as the prepared substrate surface 28*a*. The second side 154*b* (see FIG. 6A) of the curable film adhesive layer 76 (see FIGS. 6A, 6B) is adjacent to, and coupled or attached to, the substrate surface 28, such as the prepared substrate surface 28*a*, of the composite structure 22.

EXAMPLE

An example of a version of a laminated hybrid metallized polymer film 10, such as in the form of laminated hybrid metallized polymer film 10*b* (see FIG. 5A), that includes a pressure sensitive adhesive (PSA) layer, was formed. Two (2) pieces of 0.0015 inch thick commercially pure titanium (CP Ti) metal foil were cleaned and surface treated with a sol-gel process, and primed with a primer layer. The titanium foil layer was then laminated, using a laminating adhesive in the form of a two-part urethane adhesive layer, to a 0.0015 inch thick polymer film layer in the form of a polyetheretherketone (PEEK) film layer, backed with a pressure sensitive adhesive (PSA) layer. For the example of the laminated hybrid metallized polymer film formed, the lamination process of laminating the titanium foil layer to the PEEK film layer was performed using a laboratory-scale Mayer rod drawdown coating system. Larger scale quantities of this lamination may be fabricated using industrial roll-to-roll systems.

The laminated hybrid metallized polymer film formed was then installed on substrate surface edges of a candidate carbon fiber reinforced plastic (CFRP) part to make a prototype part. Installation of the laminated hybrid metallized polymer film was fast and simple, due to the handleability of the laminated hybrid metallized polymer film. The PSA layer acted as a polymer backing film and added flexibility to the hybrid metal film portion of the titanium metal foil laminated to the PEEK film layer, and made it easier to install the titanium metal foil portion without creasing or other possible unintended damage. The use of the PSA layer greatly simplified the adhering process to the substrate surface edges of the CFRP part. This exemplary version of the laminated hybrid metallized polymer film would be particularly appropriate in areas that do not have significant fluid exposure, as PSA adhesives have limited fluid exposure. The laminated hybrid metallized polymer film provided erosion edge protection to the substrate surface edges of the CFRP part (composite structure) that were covered by the laminated hybrid metallized polymer film.

Figure 7:
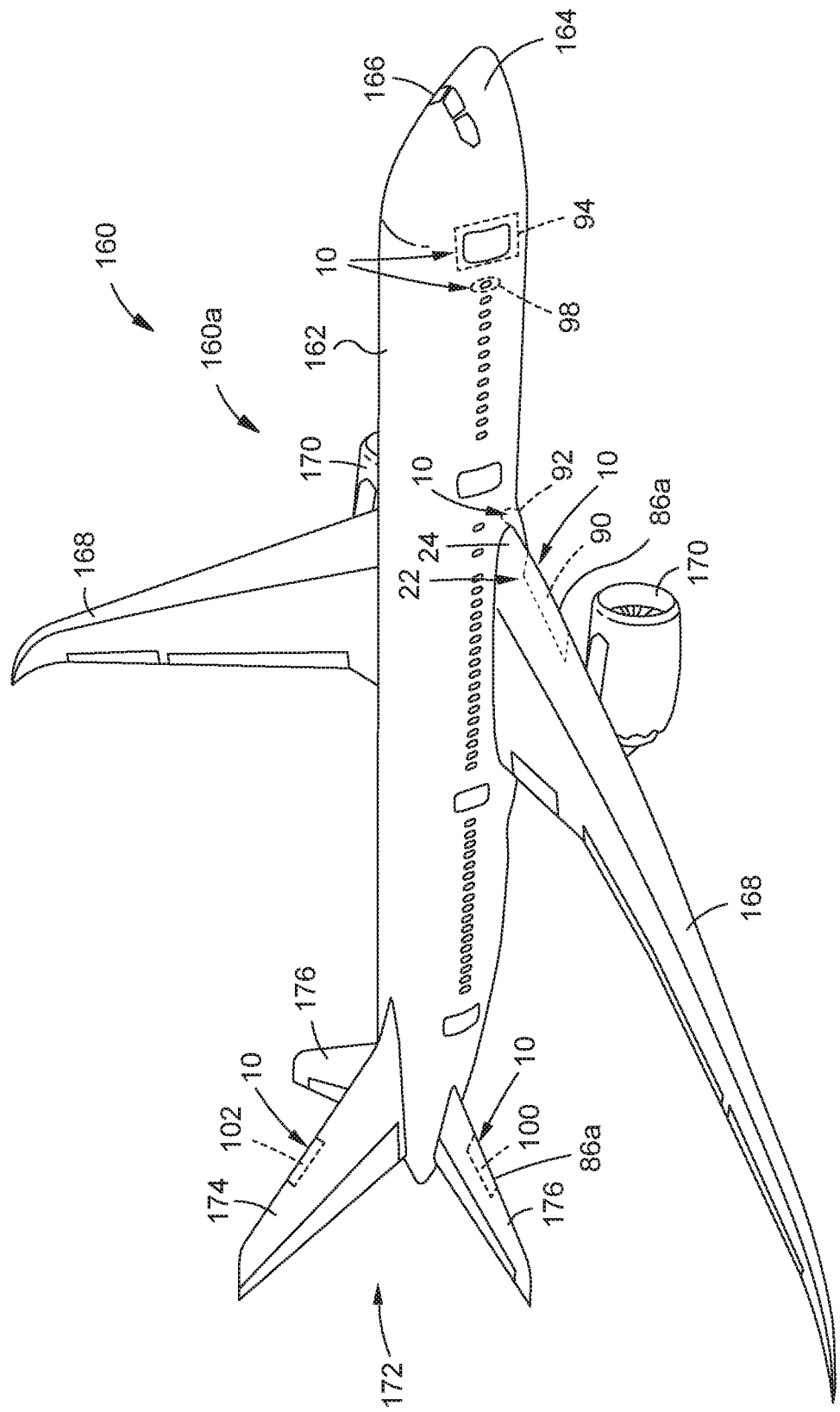
FIG. 7 is an illustration of a perspective view of an air vehicle that includes one or more versions of a laminated hybrid metallized polymer film of the disclosure.

Now referring to FIG. 7, FIG. 7 is an illustration of a perspective view of an air vehicle 160, such as in the form of aircraft 160*a*, that includes one or more versions of the laminated hybrid metallized polymer film 10 of the disclosure applied to one or more composite structures 22, such as one or more aircraft composite parts 24*a*. As shown in FIG. 7, the air vehicle 160, such as in the form of aircraft 160*a*, comprises a fuselage 162, a nose 164, a cockpit 166, wings 168 coupled to the fuselage 162, engines 170, and a tail 172 including a first tail portion 174, for example, a vertical stabilizer 102, and second tail portions 176, for example, horizontal stabilizers 100.

As further shown in FIG. 7, the laminated hybrid metallized polymer film 10 may preferably be used to cover one or more leading edges 86a, of composite structures 22, such as aircraft composite structures 24. As shown in FIG. 7, the leading edges 86a that may be covered may include leading edges 86a of wing panels 90, barrel sections 92, passenger doors 94, access doors 96, window surrounds 98, horizontal stabilizers 100, and vertical stabilizers 102 of the air vehicle 160, such as the aircraft 160a.

In an exemplary version, the composite structure 22 (see FIG. 7) comprises the aircraft composite structure 24 (see FIG. 7) on the air vehicle 160 (see FIG. 7), such as the aircraft 160a (see FIG. 7). In other versions of the composite structure 22 (see FIG. 2), the composite structure 22 may comprise a rotorcraft composite structure on a rotorcraft, a spacecraft composite structure on a spacecraft, a satellite composite structure on a satellite, a watercraft composite structure on a watercraft, an automobile composite structure on an automobile, a truck composite structure on a truck, a windmill blade composite structure on a windmill, or another suitable composite structure 22.

Figure 8:
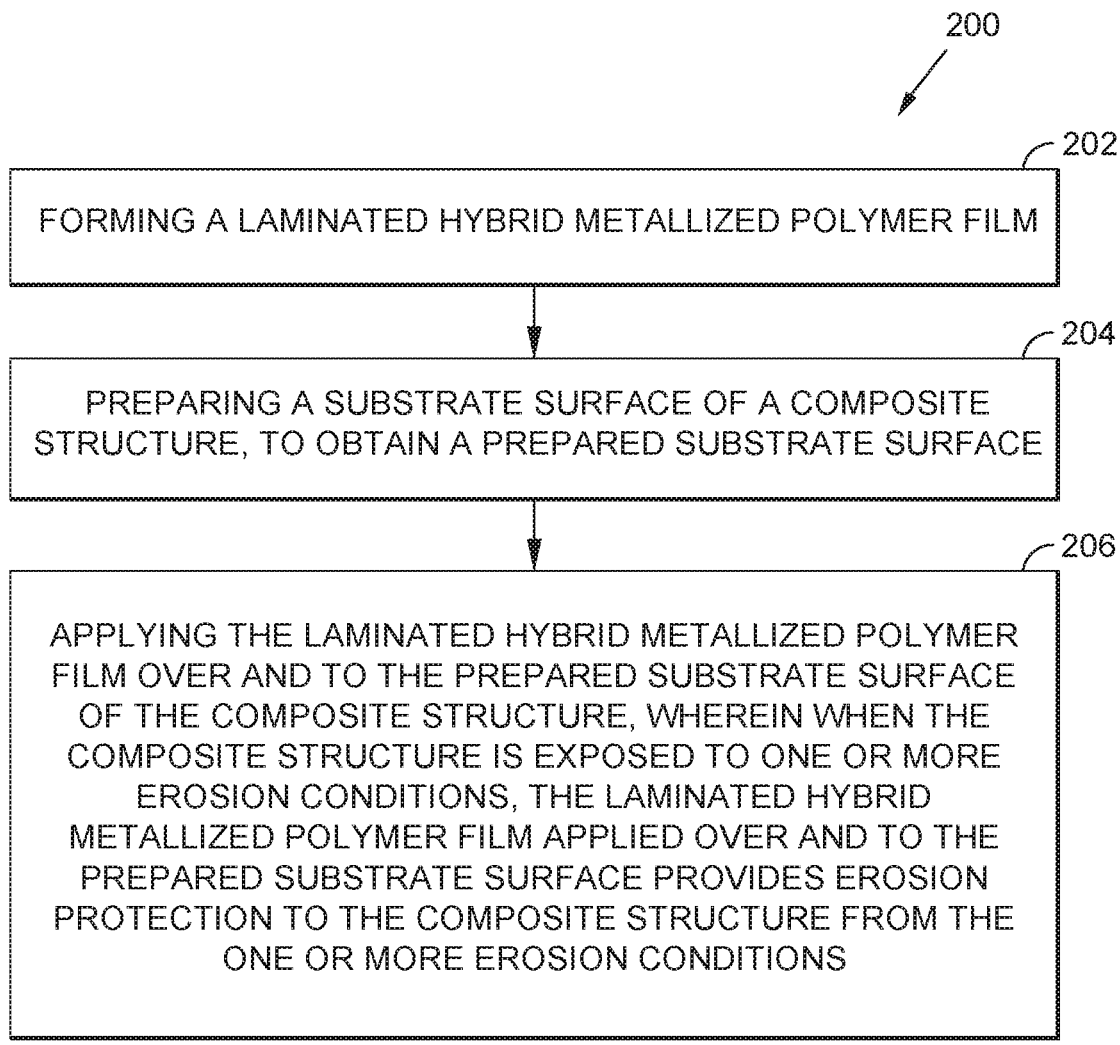
FIG. 8 is an illustration of a flow diagram of a version of a method of the disclosure.

Now referring to FIG. 8, FIG. 8 is an illustration of a flow diagram of a version of a method 200 of the disclosure. In another version of the disclosure, there is provided the method 200 for providing erosion protection 14 (see FIG. 2) of a composite structure 22 (see FIG. 2), such as an aircraft composite structure 24 (see FIG. 2).

The blocks in FIG. 8 represent operations and/or portions thereof, or elements, and lines connecting the various blocks do not imply any particular order or dependency of the operations or portions thereof, or elements. FIG. 8 and the disclosure of the steps of the method 200 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 8, the method 200 comprises the step of forming 202 a laminated hybrid metallized polymer film 10 (see FIG. 1). As discussed in detail above, the laminated hybrid metallized polymer film 10 comprises a metal foil layer 40 (see FIG. 1), a laminating adhesive layer 50 (see FIG. 1) underlying the metal foil layer 40, and a polymer film layer 60 (see FIG. 1) underlying the laminating adhesive layer 50, where the metal foil layer 40, the laminating adhesive layer 50, and the polymer film layer 60 preferably comprise the hybrid metal film portion 80 (see FIG. 2) of the laminated hybrid metallized polymer film 10. The polymer film layer 60 is laminated to the metal foil layer 40 with the laminating adhesive layer 50 coupled between the metal foil layer 40 and the polymer film layer 60.

As discussed in detail above, the laminated hybrid metallized polymer film 10 further comprises an adhesive layer 70 (see FIG. 1) underlying the polymer film layer 60.

The forming 202 (see FIG. 8) step of the method 200 (see FIG. 8) may further comprise forming the laminated hybrid metallized polymer film 10 (see FIG. 1) with the metal foil layer 40 preferably comprising one of, a titanium foil layer 40a, a titanium alloy foil layer 40b, a nickel foil layer 40c a nickel alloy foil layer 40d, a stainless steel foil layer 40e, a stainless steel alloy foil layer 40f, an aluminum foil layer 40g, an aluminum alloy foil layer 40h, a copper foil layer 40i, a copper alloy foil layer 40j, or another suitable metal foil layer 40. More preferably, the metal foil layer 40 comprises the titanium foil layer 40a.

The forming 202 (see FIG. 8) step of the method 200 (see FIG. 8) may further comprise surface treating a surface 45 (see FIG. 1) of the metal foil layer 40 (see FIGS. 1-2) with a surface treatment process 104 (see FIG. 2), to obtain a treated surface 45a (see FIG. 1), and priming the treated surface 45a of the metal foil layer 40 with a primer layer 47 (see FIG. 1), prior to the polymer film layer 60 being laminated to the metal foil layer 40, and prior to obtaining the formed laminated hybrid metallized polymer film 10. One or more surfaces 45 (see FIG. 1) of the metal foil layer 40, for example, a second side 140b (see FIG. 5A) of the metal foil layer 40, may be surface treated with one or more surface treatment processes 104 (see FIG. 2), to obtain one or more treated surfaces 45a (see FIG. 1), for example, to facilitate adhesion to a laminating adhesive layer 50 (see FIG. 1) of the laminated hybrid metallized polymer film 10. An example of a surface treatment process 104 that may be used includes a sol-gel process 106 (see FIG. 2) to treat or prepare the metal foil layer 40, such as a sol-gel process disclosed in U.S. Pat. Nos. 5,939,197, 5,958,578, and 6,797,376, the contents of which are hereby incorporated by reference in their entireties. However, other types of surface treatment processes 104 may also be used to surface treat the metal foil layer 40 prior to undergoing a lamination process 59 (see FIG. 2). In addition, the one or more treated surfaces 45a of the metal foil layer 40 may then be primed with a primer layer 47 (see FIGS. 1, 5A). The primer layer 47 is preferably applied with a primer application process 118 (see FIG. 2).

In addition, the forming 202 (see FIG. 8) step of the method 200 (see FIG. 8) may further comprise processing or modifying the metal foil layer 40 prior to the polymer film layer 60 being laminated to the metal foil layer 40, and prior to obtaining the formed laminated hybrid metallized polymer film 10. The metal foil layer 40 may have various configurations 46 (see FIG. 1). As shown in FIG. 1, the metal foil layer 40 may have a configuration 46 comprising a plain metal foil 46a (see also FIG. 3A), which is not processed or modified before application to the surface 26 (see FIG. 2), such as the substrate surface 28 (see FIG. 2), of the composite structure 22 (see FIG. 2). Alternatively, as shown in FIG. 1, the metal foil layer 40 may be processed or modified and have a configuration 46 comprising one of, a slotted metal foil 46b (see also FIG. 3B), a perforated metal foil 46c (see also FIG. 3C), an expanded metal foil 46d (see also FIG. 3D), a mesh metal foil 46e (see also FIG. 3E), or another suitable configuration 46.

The forming 202 (see FIG. 8) step of the method 200 (see FIG. 8) may further comprise forming the laminated hybrid metallized polymer film 10 with the laminating adhesive layer 50 (see FIG. 1) comprising one of, a urethane adhesive layer 50a (see FIG. 1) including a polyurethane adhesive layer 50b (see FIG. 1), an epoxy adhesive layer 50c (see FIG. 1), a polysiloxane adhesive layer 50d (see FIG. 1), a silicone adhesive layer 50e (see FIG. 1), an acrylic adhesive layer 50f (see FIG. 1), or another suitable laminating adhesive layer 50. The forming 202 (see FIG. 8) step of the method 200 (see FIG. 8) may further comprise forming the laminated hybrid metallized polymer film 10 with the polymer film layer 60 comprising one of, a polyether ether ketone (PEEK) film layer 60a, a polyester film layer 60b, a polyethylene terephthalate (PET) film layer 60c, a polypropylene (PP) film layer 60d, a polyethylene (PE) film layer 60e, a polytrimethylene terephthalate (PTT) film layer 60f, a polyamide (PA) film layer 60g, a polyetherimide (PEI) film layer 60h, a polyvinyl chloride (PVC) film layer 60i, a polycarbonate (PC) film layer 60j, a nylon film layer 60k, a polyetherketoneketone (PEKK) film layer 60l, a polyphenylsulfone (PPSU) film layer 60m, a polyphenylene sulfide (PPS) film layer 60n, an ethylene chlorotrifluoroethylene (ECTFE) film layer 60o, a polyvinylidene fluorine (PVDF) film layer 60p, or another suitable polymer film layer 60.

The forming 202 (see FIG. 8) step of the method 200 (see FIG. 8) may further comprise forming the laminated hybrid metallized polymer film 10 with the adhesive layer 70 (see FIG. 1) comprising one of, a sealant adhesive layer 72 (see FIG. 1) including a polythioether sealant adhesive layer 72a (see FIG. 1), a polysulfide sealant adhesive layer 72b (see FIG. 1), or another suitable sealant adhesive layer 72; a pressure sensitive adhesive (PSA) layer 74 (see FIG. 1); a curable film adhesive layer 76 (see FIG. 1) including a heat curable film adhesive layer 76a (see FIG. 1), or another suitable adhesive layer 70.

The laminated hybrid metallized polymer film 10 (see FIG. 1) may be in the form 30 (see FIG. 1) of a tape 32 (see FIG. 1), including a tape roll 32a (see FIG. 1), or a tape strip 32b (see FIG. 1). Alternatively, the laminated hybrid metallized polymer film 10 may be the form 30 of an applique 34 (see FIG. 1), a sheet 36 (see FIG. 1), an overlay 38 (see FIG. 1), or another suitable form 30.

As shown in FIG. 8, the method 200 further comprises the step of preparing 204 a substrate surface 28 (see FIG. 2) of the composite structure 22 (see FIG. 2), such as an aircraft composite structure 24 (see FIG. 2), to obtain a prepared substrate surface 28a (see FIG. 2). The preparing 204 (see FIG. 8) step of the method 200 (see FIG. 8) may comprise preparing 204 the substrate surface 28 of the composite structure 22 with one or more surface treatment processes 104 (see FIG. 2), such as cleaning, smoothing, polishing, or another suitable surface treatment processes 104. In addition, the preparing 204 (see FIG. 8) step of the method 200 (see FIG. 8) may further comprise applying an edge seal layer 108 (see FIG. 2) over the substrate surface 28; applying a primer layer 114 (see FIG. 2) over the substrate surface 28; or applying the edge seal layer 108 over the substrate surface 28 and applying the primer layer 114 over the edge seal layer 108. Alternatively, the laminated hybrid metallized polymer film 10 (see FIGS. 4C, 5C, 6C) may be applied directed to the substrate surface 28, such as the prepared substrate surface 28a, without the edge seal layer 108 (see FIGS. 4B, 5B, 6B) and the primer layer 114 (see FIGS. 4B, 5B, 6B).

As shown in FIG. 8, the method 200 further comprises the step of applying 206 the laminated hybrid metallized polymer film 10 over and to the prepared substrate surface 28a (see FIG. 2) of the composite structure 22 (see FIG. 2), as the aircraft composite structure 24 (see FIG. 2). The adhesive layer 70 adheres the polymer film layer 60 to the prepared substrate surface 28a. When the composite structure 22, such as the aircraft composite structure 24, is exposed to one or more erosion conditions 16 (see FIG. 2), the laminated hybrid metallized polymer film 10 applied over and to the prepared substrate surface 28a provides erosion protection 14 (see FIG. 2) to the composite structure 22 from the one or more erosion conditions 16.

The applying 206 (see FIG. 8) step of the method 200 (see FIG. 8) further comprises applying the laminated hybrid metallized polymer film 10 over and to the prepared substrate surface 28a of the composite structure 22 comprising an aircraft composite structure 24 (see FIG. 2), and further wherein when the aircraft composite structure 24 is exposed to one or more erosion conditions 16 (see FIG. 2) including an airstream 18 (see FIG. 2), for example, an external airstream 18a (see FIG. 2), where the laminated hybrid metallized polymer film 10 is applied over and to the prepared substrate surface 28a to prevent or minimize delamination 20 (see FIG. 2) of one or more cut edges 86b (see FIG. 2) of the prepared substrate surface 28a and to provide erosion protection 14 of the aircraft composite structure 24 from the one or more erosion conditions 16 including the airstream 18.

Figure 9:
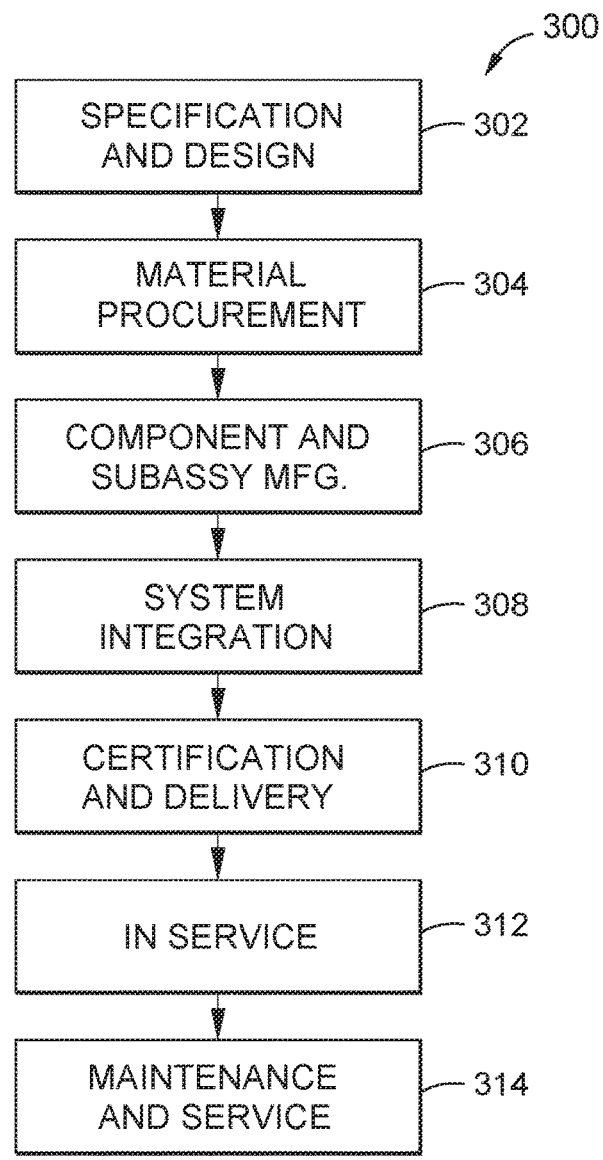
FIG. 9 is an illustration of a flow diagram of an exemplary aircraft manufacturing and service method.
Figure 10:
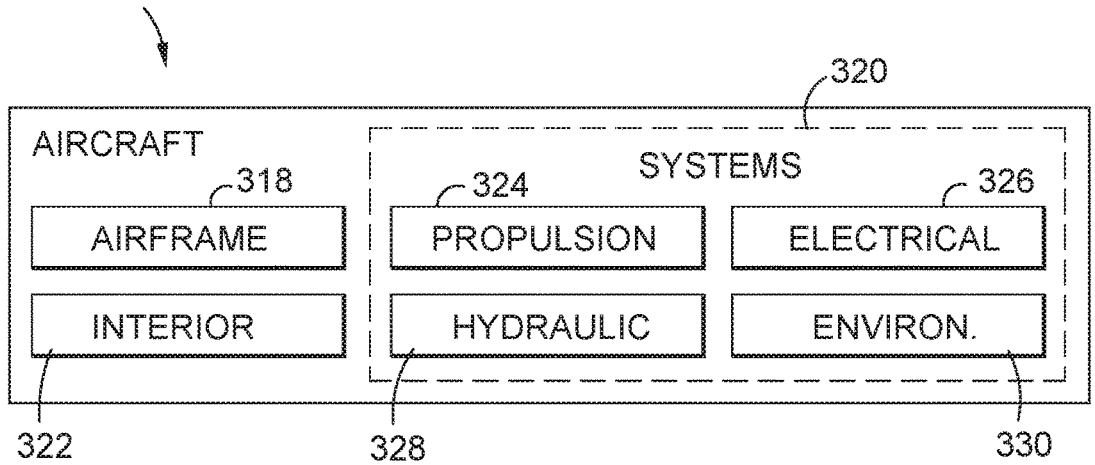
FIG. 10 is an illustration of an exemplary block diagram of an aircraft.

Now referring to FIGS. 9 and 10, FIG. 9 is an illustration of a flow diagram of an exemplary aircraft manufacturing and service method 300, and FIG. 10 is an illustration of an exemplary block diagram of an aircraft 316. Referring to FIGS. 9 and 10, versions of the disclosure may be described in the context of the aircraft manufacturing and service method 300 as shown in FIG. 9, and the aircraft 316 as shown in FIG. 10.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed embodiments of the laminated hybrid metallized polymer film 10 (see FIGS. 1, 4A, 5A, 6A), the system 12 (see FIGS. 2, 4B-4C, 5B-5C, 6B-6C), and method 200 (see FIG. 8) provide erosion protection 14 (see FIG. 2) from one or more erosion conditions 16 (see FIG. 2), for example, an airstream 18 (see FIG. 2), such as an external airstream 18a (see FIG. 2), to prevent or minimize delamination 20 of a composite structure 22 (see FIG. 2), such as an aircraft composite structure 24 (see FIG. 2). In particular, the laminated hybrid metallized polymer film 10 (see FIGS. 1, 4A, 5A, 6A) provides for erosion protection 14 of edges 86 (see FIG. 2), such as leading edges 86a (see FIG. 2), with cut edges 86b, of surfaces 26 (see FIG. 2) of composite structures 22. As discussed above, the laminated hybrid metallized polymer film 10 (see FIGS. 1, 4A, 5A, 6A) has a hybrid metal film portion 80 (see FIG. 2) comprising a metal foil layer 40 (see FIGS. 1-2), such as a titanium foil layer 40a (see FIG. 2), that is very thin and lightweight, laminated with a laminating adhesive layer 50 (see FIGS. 1-2), to a polymer film layer 60 (see FIGS. 1-2). As discussed above, the laminated hybrid metallized polymer film 10 further has a bonding adhesive portion 81 (see FIG. 2) that adheres or bonds the hybrid metal film portion 80 to a substrate surface 28 (see FIG. 2), such as a prepared substrate surface 28a (see FIG. 2), of the composite structure 22, such as the aircraft composite structure 24. The hybrid metal film portion 80 may be applied to the substrate surface 28 of the composite structure 22, such as the aircraft composite structure 24 using several options, including using a sealant adhesive layer 72 (see FIG. 2), using a pressure sensitive adhesive (PSA) layer 74 (see FIG. 2) similar to a peel-and-stick process, for example, an applique, or using a curable film adhesive layer 76 (see FIG. 2), such as a heat curable film adhesive layer (see FIG. 2).

Moreover, disclosed embodiments of the laminated hybrid metallized polymer film 10 (see FIGS. 1, 4A, 5A, 6A), the system 12 (see FIGS. 2, 4B-4C, 5B-5C, 6B-6C), and method 200 (see FIG. 8) provide a laminated hybrid metallized polymer film 10 (see FIGS. 1, 4A, 5A, 6A) or hybrid film product that is easy to handle, manipulate, cut, install, and apply to a surface 26 (see FIG. 2), such as a substrate surface 28, for example, a prepared substrate surface 28a (see FIG. 2), and leading edges 86a (see FIG. 2) and cut edges 86b (see FIG. 2), of composite structures 22, such as aircraft composite structures 24, as compared to known thicker and heavier metal foil products applied to surfaces and leading edges of aircraft composite structures. Thus, the time required to handle, manipulate, cut, install, and apply the laminated hybrid metallized polymer film 10 onto the composite structures 22, such as the aircraft composite structures 24, may be reduced, as compared to such known metal foil products. The laminated hybrid metallized polymer film 10 preferably has improved handleability due to the flexibility of the polymer film layer 60 and the thinness and light weight of the metal foil layer 40 used, as compared to known thicker and heavier metal foil products applied to surfaces and leading edges of aircraft composite structures. Since the laminated hybrid metallized polymer film 10 has a thinner and lighter weight metal foil layer 40 that is easier to handle, with the polymer film layer 60 laminated to the metal foil layer 40, the cost of manufacturing and maintaining the laminated hybrid metallized polymer film 10 for erosion protection 14 is decreased, as compared to thicker and heavier metal foil products.

In addition, disclosed embodiments of the laminated hybrid metallized polymer film 10 (see FIGS. 1, 4A, 5A, 6A) may be more easily formed over curved surfaces 84 (see FIG. 2) with complex curvature 83 (see FIG. 2), for example, leading edges 86a (see FIGS. 2, 7) of wing panels 90 (see FIGS. 2, 7), barrel sections 92 (see FIGS. 2, 7), passenger doors 94 (see FIGS. 2, 7), access doors 96 (see FIG. 2), window surrounds 98 (see FIGS. 2, 7), horizontal stabilizers 100 (see FIGS. 2, 7), and vertical stabilizers 102 (see FIGS. 2, 7), of aircraft composite structures 24 (see FIGS. 2, 7). Moreover, secondary processing to form the metal material 44, such as titanium 44a, into a curved shape may no longer be needed.

Further, the laminated hybrid metallized polymer film 10 preferably maintains the excellent erosion capabilities and performance of the metal materials 44 (see FIG. 1), and in particular, of titanium 44a (see FIG. 1) and titanium alloy 44b, used for the metal foil layer 40, and may greatly reduce possible rework by mitigating any possible damage that might occur to the metal foil layer 40, prior to application on and to the composite structure 22, such as the aircraft composite structure 24. In particular, the metal foil layer 40, such as the titanium foil layer 40a and the titanium alloy foil layer 40b, serve as effective means to provide erosion protection 14 to cut edges 86b (see FIG. 2) of aircraft composite structures 24 (see FIGS. 2, 7) that are exposed to one or more erosion conditions 16 (see FIG. 2), such as an airstream 18 (see FIG. 2), for example, an external airstream 18a (see FIG. 2).

In addition, disclosed embodiments of the laminated hybrid metallized polymer film 10 (see FIGS. 1, 4A, 5A, 6A), the system 12 (see FIGS. 2, 4B-4C, 5B-5C, 6B-6C), and method 200 (see FIG. 8) provide a laminated hybrid metallized polymer film 10 that may be manufactured, or processed, in easily applied and flexible forms 30, such as a tape 32, including a tape roll 32a, or a tape strip 32b, an applique 34, a sheet 36, an overlay 38, or another suitable form 30. The ease of application of the laminated hybrid metallized polymer film 10 to the composite structures 22, such as the aircraft composite structures 24, may reduce the time and labor required to apply the laminated hybrid metallized polymer film 10, as compared to thicker and heavier metal foil products that may be labor intensive to apply, and thus, in turn, may reduce the cost of installation. Moreover, the laminated hybrid metallized polymer film 10 may be easily removed and replaced as necessary for maintainability of the air vehicle 160 (see FIG. 7), such as the aircraft 160a (see FIG. 7), or another suitable vehicle or structure.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. A laminated hybrid metallized polymer film for erosion protection of an aerospace composite structure, the laminated hybrid metallized polymer film comprising:

a metal foil layer being a topmost layer of the laminated hybrid metallized polymer film, the metal foil layer comprising one of, a titanium foil layer, a titanium alloy foil layer, a nickel foil layer, a nickel alloy foil layer, a stainless steel foil layer, or a stainless steel alloy foil layer, and the metal foil layer having a configuration comprising one of, a slotted metal foil, a perforated metal foil, an expanded metal foil, or a mesh metal foil;

a laminating adhesive layer directly underlying the metal foil layer, the laminating adhesive layer comprising one of, a urethane adhesive layer including a polyurethane adhesive layer, an epoxy adhesive layer, a polysiloxane adhesive layer, a silicone adhesive layer, or an acrylic adhesive layer, wherein the laminating adhesive layer has a thickness in a range of from 0.0001 inch to 0.0020 inch;
a polymer film layer directly underlying the laminating adhesive layer, the polymer film layer laminated to the metal foil layer with the laminating adhesive layer directly coupled between the metal foil layer and the polymer film layer; and
an adhesive layer directly underlying the polymer film layer, the adhesive layer directly adhering the polymer film layer to a substrate surface having one or more cut edges of the aerospace composite structure, wherein the adhesive layer has a thickness in a range of from 0.005 inch to 0.010 inch, and further wherein the adhesive layer and the laminating adhesive layer have a total thickness in a range of from 0.0051 inch to 0.012 inch,
wherein the metal foil layer, the laminating adhesive layer, the polymer film layer, and the adhesive layer form the laminated hybrid metallized polymer film, in a flexible form having improved handleability and installation, the installation of the laminated hybrid metallized polymer film being facilitated by a formability of the laminated hybrid metallized polymer film, the flexible form comprising one of, a tape, an applique, a sheet, or an overlay, for direct application over and to the substrate surface having the one or more cut edges of the aerospace composite structure, the aerospace composite structure comprising one of, a wing panel, a barrel section of a fuselage, a passenger door, an access door, a window surround, a horizontal stabilizer, or a vertical stabilizer, and the laminated hybrid metallized polymer film providing erosion protection of the aerospace composite structure from one or more erosion conditions, and preventing or minimizing delamination of the one or more cut edges of the aerospace composite structure.

2. The laminated hybrid metallized polymer film of claim 1, wherein the tape comprises one of, a tape roll, or a tape strip.

3. The laminated hybrid metallized polymer film of claim 1, wherein the metal foil layer is treated with a sol-gel process to facilitate adhesion to the laminating adhesive layer.

4. The laminated hybrid metallized polymer film of claim 1, wherein the metal foil layer is primed with a primer layer prior to the polymer film layer being laminated to the metal foil layer.

5. The laminated hybrid metallized polymer film of claim 4, wherein the primer layer comprises a primer material comprising one of, a bond primer, a urethane compatible epoxy primer, an adhesive bond primer, a heat-curing adhesive bond primer, a corrosion inhibiting primer, or a chromate-based modified epoxy primer.

6. The laminated hybrid metallized polymer film of claim 1, wherein the metal foil layer has a thickness in a range of from 0.0001 inch to 0.020 inch.

7. The laminated hybrid metallized polymer film of claim 1, wherein the polymer film layer comprises an elastomeric polymer backing film that is laminated to the metal foil layer, via the laminating adhesive layer, using a lamination process.

8. The laminated hybrid metallized polymer film of claim 1, wherein the polymer film layer comprises one of, a polyether ether ketone (PEEK) film layer, a polyester film layer, a polyethylene terephthalate (PET) film layer, a polypropylene (PP) film layer, a polyethylene (PE) film layer, a polytrimethylene terephthalate (PTT) film layer, a polyamide (PA) film layer, a polyetherimide (PEI) film layer, a polyvinyl chloride (PVC) film layer, a polycarbonate (PC) film layer, a nylon film layer, a polyetherketoneketone (PEKK) film layer, a polyphenylsulfone (PPSU) film layer, a polyphenylene sulfide (PPS) film layer, an ethylene chlorotrifluoroethylene (ECTFE) film layer, or a polyvinylidene fluorine (PVDF) film layer.

9. The laminated hybrid metallized polymer film of claim 1, wherein the polymer film layer has a thickness in a range of from 0.001 inch to 0.005 inch.

10. The laminated hybrid metallized polymer film of claim 1, wherein the adhesive layer comprises one of, a sealant adhesive layer including a polythioether sealant adhesive layer, or a polysulfide sealant adhesive layer; a pressure sensitive adhesive layer; or a curable film adhesive layer including a heat curable film adhesive layer.

11. The laminated hybrid metallized polymer film of claim 10, wherein the pressure sensitive adhesive layer comprises one of, acrylic, or a silicone-based pressure sensitive adhesive.

12. A system for erosion protection of an aircraft composite structure, the system comprising:
a substrate surface of the aircraft composite structure, the substrate surface having one or more cut edges, and the aircraft composite structure comprising one of, a wing panel, a barrel section of a fuselage, a passenger door, an access door, a window surround, a horizontal stabilizer, or a vertical stabilizer;
an edge seal layer directly applied over and to the substrate surface;
a primer layer directly applied over and to the edge seal layer; and
a laminated hybrid metallized polymer film directly applied over and to the primer layer, the laminated hybrid metallized polymer film being in a flexible form comprising one of, a tape, an applique, a sheet, or an overlay, the laminated hybrid metallized polymer film comprising:
a metal foil layer comprising one of, a titanium foil layer, a titanium alloy foil layer, a nickel foil layer, a nickel alloy foil layer, a stainless steel foil layer, or a stainless steel alloy foil layer, and the metal foil layer having a configuration comprising one of, a slotted metal foil, a perforated metal foil, an expanded metal foil, or a mesh metal foil;
a laminating adhesive layer directly underlying the metal foil layer, the laminating adhesive layer comprising one of, a urethane adhesive layer including a polyurethane adhesive layer, an epoxy adhesive layer, a polysiloxane adhesive layer, a silicone adhesive layer, or an acrylic adhesive layer, wherein the laminating adhesive layer has a thickness in a range of from 0.0001 inch to 0.0020 inch;
a polymer film layer directly underlying the laminating adhesive layer, the polymer film layer laminated to the metal foil layer with the laminating adhesive layer directly coupled between the metal foil layer and the polymer film layer; and
an adhesive layer directly underlying the polymer film layer, the adhesive layer directly adhering the polymer film layer to the primer layer, wherein the adhesive layer has a thickness in a range of from 0.005 inch to 0.010 inch, and further wherein the adhesive layer and the laminating adhesive layer have a total thickness in a range of from 0.0051 inch to 0.012 inch, wherein the flexible form of the laminated hybrid metallized polymer film has improved handleability and installation, the installation of the laminated hybrid metallized polymer film being facilitated by a formability of the laminated hybrid metallized polymer film, and further wherein, when the aircraft composite structure is exposed to an airstream, the laminated hybrid metallized polymer film applied over and to the aircraft composite structure provides erosion protection of the aircraft composite structure from the airstream, and prevents or minimizes delamination of the one or more cut edges of the aircraft composite structure.

13. The system of claim 12, wherein the edge seal layer comprises an edge seal material comprising one of, urethanes, thioethers, epoxies, or polysulfides.

14. The system of claim 12, wherein the primer layer comprises a primer material comprising one of, a bond primer, a urethane compatible epoxy primer, an adhesive bond primer, a heat-curing adhesive bond primer, a corrosion inhibiting primer, or a chromate-based modified epoxy primer.

15. The system of claim 12, wherein the polymer film layer comprises one of, a polyether ether ketone (PEEK) film layer, a polyester film layer, a polyethylene terephthalate (PET) film layer, a polypropylene (PP) film layer, a polyethylene (PE) film layer, a polytrimethylene terephthalate (PTT) film layer, a polyamide (PA) film layer, a polyetherimide (PEI) film layer, a polyvinyl chloride (PVC) film layer, a polycarbonate (PC) film layer, a nylon film layer, a polyetherketoneketone (PEKK) film layer, a polyphenylsulfone (PPSU) film layer, a polyphenylene sulfide (PPS) film layer, an ethylene chlorotrifluoroethylene (ECTFE) film layer, or a polyvinylidene fluorine (PVDF) film layer; and wherein the adhesive layer comprises one of, a sealant adhesive layer including a polythioether sealant adhesive layer, or a polysulfide sealant adhesive layer; a pressure sensitive adhesive layer; or a curable film adhesive layer including a heat curable film adhesive layer.

16. The system of claim 12, wherein the tape comprises one of, a tape roll, or a tape strip.

17. A method for providing erosion protection of an aircraft composite structure, the method comprising the steps of:

forming a laminated hybrid metallized polymer film in a flexible form comprising one of, a tape, an applique, a sheet, or an overlay, the laminated hybrid metallized polymer film comprising:

a metal foil layer being a topmost layer of the laminated hybrid metallized polymer, the metal foil layer comprising one of, a titanium foil layer, a titanium alloy foil layer, a nickel foil layer, a nickel alloy foil layer, a stainless steel foil layer, or a stainless steel alloy foil layer, and the metal foil layer having a configuration comprising one of, a slotted metal foil, a perforated metal foil, an expanded metal foil, or a mesh metal foil;

a laminating adhesive layer directly underlying the metal foil layer, the laminating adhesive layer comprising one of, a urethane adhesive layer including a polyurethane adhesive layer, an epoxy adhesive layer, a polysiloxane adhesive layer, a silicone adhesive layer, or an acrylic adhesive layer, wherein the laminating adhesive layer has a thickness in a range of from 0.0001 inch to 0.0020 inch;

a polymer film layer directly underlying the laminating adhesive layer, the polymer film layer laminated to the metal foil layer with the laminating adhesive layer directly coupled between the metal foil layer and the polymer film layer; and an adhesive layer directly underlying the polymer film layer, wherein the adhesive layer has a thickness in a range of from 0.005 inch to 0.010 inch, and further wherein the adhesive layer and the laminating adhesive layer have a total thickness in a range of from 0.0051 inch to 0.012 inch, preparing a substrate surface having one or more cut edges of the aircraft composite structure, to obtain a prepared substrate surface, the aircraft composite structure comprising one of, a wing panel, a barrel section of a fuselage, a passenger door, an access door, a window surround, a horizontal stabilizer, or a vertical stabilizer; and applying the laminated hybrid metallized polymer film directly over and to the prepared substrate surface of the aircraft composite structure, the adhesive layer directly adhering the polymer film layer to the prepared substrate surface, wherein the flexible form of the laminated hybrid metallized polymer film has improved handleability and installation, the installation of the laminated hybrid metallized polymer film being facilitated by a formability of the laminated hybrid metallized polymer film, and further wherein, when the aircraft composite structure is exposed to one or more erosion conditions, the laminated hybrid metallized polymer film directly applied over and to the prepared substrate surface provides erosion protection to the aircraft composite structure from the one or more erosion conditions, and prevents or minimizes delamination of the one or more cut edges of the aircraft composite structure.

18. The method of claim 17, wherein forming the laminated hybrid metallized polymer film comprises forming the laminated hybrid metallized polymer film:

with the polymer film layer comprising one of, a polyether ether ketone (PEEK) film layer, a polyester film layer, a polyethylene terephthalate (PET) film layer, a polypropylene (PP) film layer, a polyethylene (PE) film layer, a polytrimethylene terephthalate (PTT) film layer, a polyamide (PA) film layer, a polyetherimide (PEI) film layer, a polyvinyl chloride (PVC) film layer, a polycarbonate (PC) film layer, a nylon film layer, a polyetherketoneketone (PEKK) film layer, a polyphenylsulfone (PPSU) film layer, a polyphenylene sulfide (PPS) film layer, an ethylene chlorotrifluoroethylene (ECTFE) film layer, or a polyvinylidene fluorine (PVDF) film layer.

19. The method of claim 17, wherein forming the laminated hybrid metallized polymer film further comprises surface treating a surface of the metal foil layer with a surface treatment process, to obtain a treated surface, and priming the treated surface of the metal foil layer with a primer layer, prior to the polymer film layer being laminated to the metal foil layer.

20. The method of claim 17, wherein forming the laminated hybrid metallized polymer film comprises forming the laminated hybrid metallized polymer film with the adhesive layer comprising one of, a sealant adhesive layer including a polythioether sealant adhesive layer, or a polysulfide sealant adhesive layer; a pressure sensitive adhesive layer; or a curable film adhesive layer including a heat curable film adhesive layer.

21. The method of claim 17, wherein preparing the substrate surface of the aircraft composite structure comprises one of, applying an edge seal layer over the substrate surface; applying a primer layer over the substrate surface; or, applying the edge seal layer over the substrate surface and applying the primer layer over the edge seal layer.

22. The method of claim 17, wherein applying the laminated hybrid metallized polymer film directly over and to the prepared substrate surface comprises, applying the laminated hybrid metallized polymer film directly over and to the prepared substrate surface of the aircraft composite structure, and further wherein when the aircraft composite structure is exposed to one or more erosion conditions including an airstream, the laminated hybrid metallized polymer film applied directly over and to the prepared substrate surface provides erosion protection of the aircraft composite structure from the one or more erosion conditions including the airstream.

23. A laminated hybrid metallized polymer film for erosion protection of an aircraft composite structure, the laminated hybrid metallized polymer film comprising:
 a metal foil layer being a topmost layer of the laminated hybrid metallized polymer, the metal foil layer comprising one of, a titanium foil layer, a titanium alloy foil layer, a nickel foil layer, a nickel alloy foil layer, a stainless steel foil layer, or a stainless steel alloy foil layer, and the metal foil layer being surface treated with a surface treatment process, and the metal foil layer having a configuration comprising one of, a slotted metal foil, a perforated metal foil, an expanded metal foil, or a mesh metal foil;
 a primer layer directly underlying the metal foil layer, the primer layer comprising a primer material comprising one of, a bond primer, a urethane compatible epoxy primer, an adhesive bond primer, a heat-curing adhesive bond primer, a corrosion inhibiting primer, or a chromate-based modified epoxy primer;
 a laminating adhesive layer directly underlying the primer layer, the laminating adhesive layer comprising one of, a urethane adhesive layer including a polyurethane adhesive layer, an epoxy adhesive layer, a polysiloxane adhesive layer, a silicone adhesive layer, or an acrylic adhesive layer, wherein the laminating adhesive layer has a thickness in a range of from 0.0001 inch to 0.0020 inch;
 a polymer film layer directly underlying the laminating adhesive layer, the laminating adhesive layer directly coupled between the primer layer and the polymer film layer, and the polymer film layer having a thickness in a range of 0.001 inch to 0.005 inch, and the polymer film layer comprising one of, a polyether ether ketone (PEEK) film layer, a polyester film layer, a polyethylene terephthalate (PET) film layer, a polypropylene (PP) film layer, a polyethylene (PE) film layer, a polytrimethylene terephthalate (PTT) film layer, a polyamide (PA) film layer, a polyetherimide (PEI) film layer, a polyvinyl chloride (PVC) film layer, a polycarbonate (PC) film layer, a nylon film layer, a polyetherketoneketone (PEKK) film layer, a polyphenylsulfone (PPSU) film layer, a polyphenylene sulfide (PPS) film layer, an ethylene chlorotrifluoroethylene (ECTFE) film layer, or a polyvinylidene fluorine (PVDF) film layer; and
 an adhesive layer directly underlying the polymer film layer, the adhesive layer directly adhering the polymer film layer to a substrate surface having one or more cut edges of the aircraft composite structure, wherein the adhesive layer has a thickness in a range of from 0.005 inch to 0.010 inch, and further wherein the adhesive layer and the laminating adhesive layer have a total thickness in a range of from 0.0051 inch to 0.012 inch,
wherein the metal foil layer, the primer layer, the laminating adhesive layer, the polymer film layer, and the adhesive layer form the laminated hybrid metallized polymer film, in a flexible form having improved handleability and installation, the installation of the laminated hybrid metallized polymer film being facilitated by a formability of the laminated hybrid metallized polymer film, the flexible form comprising one of, a tape, an applique, a sheet, or an overlay, for direct application over and to the substrate surface having the one or more cut edges of the aircraft composite structure, the aircraft composite structure comprising one of, a wing panel, a barrel section of a fuselage, a passenger door, an access door, a window surround, a horizontal stabilizer, or a vertical stabilizer, and the laminated hybrid metallized polymer film providing erosion protection of the aircraft composite structure from one or more erosion conditions, and preventing or minimizing delamination of the one or more cut edges of the aircraft composite structure.

* * * * *